US012498950B2

(12) United States Patent
Yoon et al.

(10) Patent No.: US 12,498,950 B2
(45) Date of Patent: *Dec. 16, 2025

(54) SIGNAL PROCESSING DEVICE AND DISPLAY APPARATUS FOR VEHICLE USING SHARED MEMORY TO TRANSMIT ETHERNET AND CONTROLLER AREA NETWORK DATA BETWEEN VIRTUAL MACHINES

(71) Applicant: LG ELECTRONICS INC., Seoul (KR)

(72) Inventors: Jaegu Yoon, Seoul (KR); Hyoungkyu Choi, Seoul (KR); Heemin Lee, Seoul (KR); Sunhee Lim, Seoul (KR); Dongwoo Han, Seoul (KR); Dongkyu Lee, Seoul (KR); Dukyung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 868 days.

This patent is subject to a terminal disclaimer.

(21) Appl. No.: 17/755,040

(22) PCT Filed: Jul. 21, 2021

(86) PCT No.: PCT/KR2021/009405
§ 371 (c)(1),
(2) Date: Apr. 19, 2022

(87) PCT Pub. No.: WO2022/181899
PCT Pub. Date: Sep. 1, 2022

(65) Prior Publication Data
US 2023/0168913 A1    Jun. 1, 2023

(30) Foreign Application Priority Data
Feb. 26, 2021 (KR) .................. 10-2021-0026453
Apr. 23, 2021 (KR) .................. 10-2021-0053004

(51) Int. Cl.
*G06F 9/455* (2018.01)
*B60K 35/00* (2024.01)
(Continued)

(52) U.S. Cl.
CPC ........ *G06F 9/45558* (2013.01); *B60K 35/213* (2024.01); *B60K 35/22* (2024.01);
(Continued)

(58) Field of Classification Search
CPC .... G06F 9/45558; G06F 3/1423; G06F 9/544; G06F 2009/4557; G06F 2009/45579;
(Continued)

(56) References Cited

U.S. PATENT DOCUMENTS 10,776,148 B1 * 9/2020 Zelenov ................ G06F 9/5027
11,188,376 B1 * 11/2021 Alexander .......... G06F 9/45558
(Continued)

FOREIGN PATENT DOCUMENTS

JP      6523298       5/2019
KR   1020010053431   6/2001
(Continued)

OTHER PUBLICATIONS

European Patent Office Application Serial Number 21878751.3 Search Report dated Mar. 11, 2024, 10 pages.
(Continued)

*Primary Examiner* — Michael W Ayers
(74) *Attorney, Agent, or Firm* — LEE, HONG, DEGERMAN, KANG & WAIMEY

(57) ABSTRACT

A signal processing device and a display apparatus for vehicles including the same are disclosed. The signal processing device includes a processor configured to perform signal processing for a display located in a vehicle, wherein the processor is configured to execute first to third virtual machines on a hypervisor in the processor, the second virtual
(Continued)

machine is operated for a first display, the third virtual machine is operated for a second display, and the first virtual machine in the processor is configured to share at least some of data with the second virtual machine and the third virtual machine for processing of divided data. Consequently, the plurality of virtual machines for the plurality of displays in the vehicle may divide and process data.

19 Claims, 25 Drawing Sheets

(51) Int. Cl.
| | |
|---|---|
| *B60K 35/21* | (2024.01) |
| *B60K 35/22* | (2024.01) |
| *B60K 35/29* | (2024.01) |
| *B60R 16/023* | (2006.01) |
| *G06F 3/14* | (2006.01) |
| *G06F 9/54* | (2006.01) |
| *G09G 5/14* | (2006.01) |
| *G09G 5/377* | (2006.01) |

(52) U.S. Cl.
CPC ............ *B60K 35/29* (2024.01); *G06F 3/1423* (2013.01); *G06F 9/544* (2013.01); *B60K 35/00* (2013.01); *B60K 2360/18* (2024.01); *B60R 16/023* (2013.01); *G06F 3/1438* (2013.01); *G06F 3/1454* (2013.01); *G06F 2009/4557* (2013.01); *G06F 2009/45579* (2013.01); *G06F 2009/45583* (2013.01); *G06F 2009/45595* (2013.01); *G09G 5/14* (2013.01); *G09G 5/377* (2013.01); *G09G 2360/06* (2013.01); *G09G 2370/022* (2013.01); *G09G 2380/10* (2013.01)

(58) Field of Classification Search
CPC . G06F 2009/45583; G06F 2009/45595; G06F 3/1438; G06F 3/1454; B60K 35/213; B60K 35/22; B60K 35/29; B60K 35/00; B60K 2360/18; B60R 16/023; G09G 2360/06; G09G 2370/022; G09G 2380/10; G09G 5/14; G09G 5/377

See application file for complete search history.

(56) References Cited

U.S. PATENT DOCUMENTS

| | | | |
|---|---|---|---|
| 2015/0058619 | A1* | 2/2015 | Sweet ..................... G06F 21/56 713/155 |
| 2015/0095910 | A1* | 4/2015 | Ge ........................ G06F 9/45558 718/1 |
| 2015/0227192 | A1* | 8/2015 | Kruglick ................ G06F 1/3296 713/323 |
| 2016/0267200 | A1* | 9/2016 | Guo ..................... G06F 16/3322 |
| 2016/0328254 | A1* | 11/2016 | Ahmed ................ G06F 9/45545 |
| 2018/0004680 | A1* | 1/2018 | Elzur .................... G06F 12/145 |
| 2018/0146020 | A1* | 5/2018 | McClure ............... H04L 65/762 |
| 2020/0326898 | A1 | 10/2020 | Mues et al. |
| 2021/0219002 | A1* | 7/2021 | Barnes ............. B64D 11/00155 |
| 2021/0294628 | A1* | 9/2021 | Tsirkin ................ G06F 9/45558 |

FOREIGN PATENT DOCUMENTS

| | | |
|---|---|---|
| KR | 1020130000253 | 1/2013 |
| KR | 101639797 | 7/2016 |
| WO | 2015-103376 | 7/2015 |

OTHER PUBLICATIONS

Chisnall, "The Definitive Guide to the Xen Hypervisor," XP055728173, Jan. 2008, 307 pages.
Sharma et al., "VSense: Virtualizing Stateful Sensors With Actuators," XP93093221, Jul. 2009, 14 pages.
Wu et al., "Comprehensive VM Protection against Untrusted Hypervisor through Retrofitted AMD Memory Encryption," XP33341999, 2018 IEEE International Symposium on High Performance Computer Architecture, Feb. 2018, 13 pages.
PCT International Application No. PCT/KR2021/009405, International Search Report dated Nov. 22, 2021, 3 pages.

* cited by examiner

FIG. 11B

| Local_vm_id | Dev_id | Memory | Buffer_id | key |
|---|---|---|---|---|
| vm_1 | camera_1 | 0x1c000000 | 1 | 1234 |
| vm_1 | camera_1 | 0x1c000000 | 1 | 1234 |
| vm_1 | gnss_1 | 0x1d000000 | 2 | 1078 |

SIGNAL PROCESSING DEVICE AND DISPLAY APPARATUS FOR VEHICLE USING SHARED MEMORY TO TRANSMIT ETHERNET AND CONTROLLER AREA NETWORK DATA BETWEEN VIRTUAL MACHINES

CROSS-REFERENCE TO RELATED APPLICATIONS

This application is the National Stage filing under 35 U.S.C. 371 of International Application No. PCT/KR2021/009405, filed on Jul. 21, 2021, which claims the benefit of earlier filing date and right of priority to Korean Application Nos. 10-2021-0026453, filed on Feb. 26, 2021, and 10-2021-0053004, filed on Apr. 23, 2021, the contents of which are all incorporated by reference herein in their entirety.

BACKGROUND OF THE INVENTION

Field of the Invention

The present disclosure relates to a signal processing device and a display apparatus for vehicle including the same, and more particularly to a signal processing device capable of dividing and processing data using a plurality of virtual machines for a plurality of displays in a vehicle and a display apparatus for vehicle including the same.

Description of the Related Art

A vehicle is an apparatus that a driver moves in a desired direction. A representative example of the vehicle is a car.

Meanwhile, a display apparatus for vehicle is located in the vehicle for convenience of users who use the vehicle.

For example, a display is disposed in a cluster in order to display various kinds of information. Meanwhile, in order to display vehicle driving information, various displays, such as an audio video navigation (AVN) display, are located in the vehicle, in addition to the cluster.

In the case in which the number of displays in the display apparatus for vehicle is increased, however, signal processing for the displays is complicated.

Particularly, in the case in which the same images are displayed on a plurality of displays, synchronization is important.

SUMMARY

An object of the present disclosure is to provide a signal processing device capable of dividing and processing data using a plurality of virtual machines for a plurality of displays in a vehicle and a display apparatus for vehicle including the same.

Another object of the present disclosure is to provide a signal processing device capable of performing high-speed data communication between a plurality of virtual machines and a display apparatus for vehicle including the same.

A further object of the present disclosure is to provide a signal processing device capable of performing high-speed data communication even though a plurality of virtual machines is driven by different operating systems and a display apparatus for vehicle including the same.

In accordance with an aspect of the present disclosure, the above and other objects can be accomplished by the provision of a signal processing device including a processor configured to perform signal processing for a plurality of display located in a vehicle, wherein the processor is configured to execute first to third virtual machines on a hypervisor in the processor, the second virtual machine is operated for a first display among the plurality of display, the third virtual machine is operated for a second display among the plurality of display, and the first virtual machine in the processor is configured to share at least some of data with the second virtual machine and the third virtual machine for processing of divided data.

Meanwhile, the first virtual machine in the processor may be configured to write some of the data in a first shared memory to be transmitted to the second virtual machine and write some other of the data in the first shared memory to be transmitted to the third virtual machine, and the second virtual machine and the third virtual machine may be configured to process the received data and write the processed data in a second shared memory.

Meanwhile, the first virtual machine in the processor may be configured to process some other of the data and write the processed data in the second shared memory.

Meanwhile, the processor may further execute a fourth virtual machine, the first virtual machine in the processor may be configured to write some other of the data in the first shared memory, and the fourth virtual machine may be configured to process received data and write the processed data in the second shared memory.

Meanwhile, the first virtual machine in the processor may create command queues for distributed processing of the data in the second virtual machine and the third virtual machine.

Meanwhile, when the second virtual machine and the third virtual machine share the same data, the first virtual machine in the processor may create one command queue.

Meanwhile, the command queue may include at least one of virtual machine index information, task information, or shared memory information.

Meanwhile, the first virtual machine in the processor may create command queues corresponding to the number of virtual machines for distributed processing of the data.

Meanwhile, in response to the data being image data, the first virtual machine in the processor may be configured to write some of the image data in the first shared memory to be transmitted to the second virtual machine and write some other of the image data in the first shared memory to be transmitted to the third virtual machine, and the second virtual machine and the third virtual machine may be configured to detect objects from the received image data and write the image data from which the objects have been detected in the second shared memory.

Meanwhile, the processor may further execute a fourth virtual machine, the first virtual machine in the processor may be configured to write some other of the image data in the first shared memory, and the third virtual machine may detect an object from the received image data and write the image data from which the object has been detected in the second shared memory.

Meanwhile, in response to the data being image data, the first virtual machine in the processor may be configured to write some of the image data in the first shared memory to be transmitted to the second virtual machine and write some other of the image data in the first shared memory to be transmitted to the third virtual machine, the second virtual machine may decrypt some of the image data and write the decrypted image data in the second shared memory, and the third virtual machine may image-process the received image data and write the image-processed image data in the second shared memory.

Meanwhile, the first virtual machine in the processor may include an input and output server interface and a security manager, and each of the second virtual machine and the third virtual machine may include an input and output client interface.

Meanwhile, the input and output server interface may transmit information regarding the first shared memory comprising key data to the input and output client interface after allocation of the first shared memory, and the input and output client interface may access the first shared memory based on the key data.

Meanwhile, the input and output server interface may receive information regarding a first buffer in the first shared memory, the first buffer being empty, may write first data in the first buffer in the first shared memory, and may transmit buffer information of the first buffer to the input and output client interfaces in the second virtual machine and the third virtual machine.

Meanwhile, a reference count of the first buffer may be changed in a first direction based on writing of the first data in the first buffer, and in response to copying of the first data from the first buffer being completed, the reference count of the first buffer may be changed in a second direction, the second direction being opposite the first direction.

Meanwhile, the processor may further execute a legacy virtual machine configured to receive and process Ethernet data, and the first virtual machine may receive, process, and output at least one of vehicle sensor data, position information data, camera image data, audio data, or touch input data.

Meanwhile, the first virtual machine may receive and process wheel speed sensor data of the vehicle, and may transmit the processed wheel speed sensor data to at least one of the second virtual machine or the third virtual machine.

In accordance with another aspect of the present disclosure, there is provided a display apparatus for vehicle, the display apparatus including a first display, a second display, and a signal processing device including a processor configured to perform signal processing for the first display and the second display, wherein the processor is configured to execute first to third virtual machines on a hypervisor in the processor, the second virtual machine is operated for the first display, the third virtual machine is operated for the second display, and the first virtual machine in the processor is configured to share at least some of data with the second virtual machine and the third virtual machine for processing of divided data.

Meanwhile, the signal processing device may be configured to divide and process image data using the plurality of virtual machines, combine the divided and processed image data, and display the composite image data through the plurality of displays.

Effects of the Disclosure

A signal processing device according to an embodiment of the present disclosure includes a processor configured to perform signal processing for a plurality of display located in a vehicle, wherein the processor is configured to execute first to third virtual machines on a hypervisor in the processor, the second virtual machine is operated for a first display among the plurality of display, the third virtual machine is operated for a second display among the plurality of display, and the first virtual machine in the processor is configured to share at least some of data with the second virtual machine and the third virtual machine for processing of divided data. Consequently, the plurality of virtual machines for the plurality of displays in the vehicle may divide and process data.

Meanwhile, high-speed data communication may be performed between the plurality of virtual machines. Furthermore, high-speed data communication may be performed even though the plurality of virtual machines is driven by different operating systems.

Meanwhile, the first virtual machine in the processor may be configured to write some of the data in a first shared memory to be transmitted to the second virtual machine and write some other of the data in the first shared memory to be transmitted to the third virtual machine, and the second virtual machine and the third virtual machine may be configured to process the received data and write the processed data in a second shared memory. Consequently, the plurality of virtual machines may divide and process data.

Meanwhile, the first virtual machine in the processor may be configured to process some other of the data and write the processed data in the second shared memory. That is, the first virtual machine may perform data processing in addition to the second virtual machine and the third virtual machine. Consequently, the plurality of virtual machines may divide and process data.

Meanwhile, the processor may further execute a fourth virtual machine, the first virtual machine in the processor may be configured to write some other of the data in the first shared memory, and the fourth virtual machine may be configured to process received data and write the processed data in the second shared memory. Consequently, the plurality of virtual machines may divide and process data.

Meanwhile, the first virtual machine in the processor may create command queues for distributed processing of the data in the second virtual machine and the third virtual machine. Consequently, the plurality of virtual machines may divide and process data.

Meanwhile, when the second virtual machine and the third virtual machine share the same data, the first virtual machine in the processor may create one command queue. Consequently, the same data may be synchronized and shared.

Meanwhile, the command queue may include at least one of virtual machine index information, task information, or shared memory information. Consequently, access to the shared memory through the command queue is possible.

Meanwhile, the first virtual machine in the processor may create command queues corresponding to the number of virtual machines for distributed processing of the data. Consequently, each virtual machine-specific command may be transmitted.

Meanwhile, in response to the data being image data, the first virtual machine in the processor may be configured to write some of the image data in the first shared memory to be transmitted to the second virtual machine and write some other of the image data in the first shared memory to be transmitted to the third virtual machine, and the second virtual machine and the third virtual machine may be configured to detect objects from the received image data and write the image data from which the objects have been detected in the second shared memory. As a result, the plurality of virtual machines for the plurality of displays in the vehicle may divide and process data at the time of object detection. Consequently, rapid data processing is possible.

Meanwhile, the processor may further execute a fourth virtual machine, the first virtual machine in the processor may be configured to write some other of the image data in the first shared memory, and the third virtual machine may detect an object from the received image data and write the image data from which the object has been detected in the second shared memory. As a result, the plurality of virtual machines for the plurality of displays in the vehicle may divide and process data at the time of object detection. Consequently, rapid data processing is possible.

Meanwhile, in response to the data being image data, the first virtual machine in the processor may be configured to write some of the image data in the first shared memory to be transmitted to the second virtual machine and write some other of the image data in the first shared memory to be transmitted to the third virtual machine, the second virtual machine may decrypt some of the image data and write the decrypted image data in the second shared memory, and the third virtual machine may image-process the received image data and write the image-processed image data in the second shared memory. Consequently, the decrypted image data may be rapidly processed.

Meanwhile, the first virtual machine in the processor may include an input and output server interface and a security manager, and each of the second virtual machine and the third virtual machine may include an input and output client interface. Consequently, high-speed data communication between the plurality of virtual machines may be performed using the input and output server interface and the input and output client interface.

Meanwhile, the input and output server interface may transmit information regarding the first shared memory comprising key data to the input and output client interface after allocation of the first shared memory, and the input and output client interface may access the first shared memory based on the key data. Consequently, 1:N data communication using the shared memory, not 1:1 data communication, may be performed between the virtual machines.

Meanwhile, the input and output server interface may receive information regarding a first buffer in the first shared memory, the first buffer being empty, may write first data in the first buffer in the first shared memory, and may transmit buffer information of the first buffer to the input and output client interfaces in the second virtual machine and the third virtual machine. Consequently, 1:N data communication using the shared memory, not 1:1 data communication, may be performed between the virtual machines.

Meanwhile, a reference count of the first buffer may be changed in a first direction based on writing of the first data in the first buffer, and in response to copying of the first data from the first buffer being completed, the reference count of the first buffer may be changed in a second direction, the second direction being opposite the first direction. After completion of copying, therefore, new data may be written in the first buffer.

Meanwhile, the processor may further execute a legacy virtual machine configured to receive and process Ethernet data, and the first virtual machine may receive, process, and output at least one of vehicle sensor data, position information data, camera image data, audio data, or touch input data. Consequently, data processed only by the legacy virtual machine and data processed by the first virtual machine may be distinguished from each other, whereby data processing may be efficiently performed.

In particular, the first virtual machine may be configured to process most of the data, whereby 1:N data sharing may be achieved.

Meanwhile, the first virtual machine may receive and process wheel speed sensor data of the vehicle, and may transmit the processed wheel speed sensor data to at least one of the second virtual machine or the third virtual machine. Consequently, at least one virtual machine may share the wheel speed sensor data of the vehicle.

Meanwhile, a display apparatus for vehicle according to an embodiment of the present disclosure includes a first display, a second display, and a signal processing device including a processor configured to perform signal processing for the first display and the second display, wherein the processor is configured to execute first to third virtual machines on a hypervisor in the processor, the second virtual machine is operated for the first display, the third virtual machine is operated for the second display, and the first virtual machine in the processor is configured to share at least some of data with the second virtual machine and the third virtual machine for processing of divided data. Consequently, the plurality of virtual machines for the plurality of displays in the vehicle may divide and process image data.

Meanwhile, the signal processing device may be configured to divide and process image data using the plurality of virtual machines, combine the divided and processed image data, and display the composite image data through the plurality of displays. Consequently, the plurality of virtual machines for the plurality of displays in the vehicle may divide and process image data.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
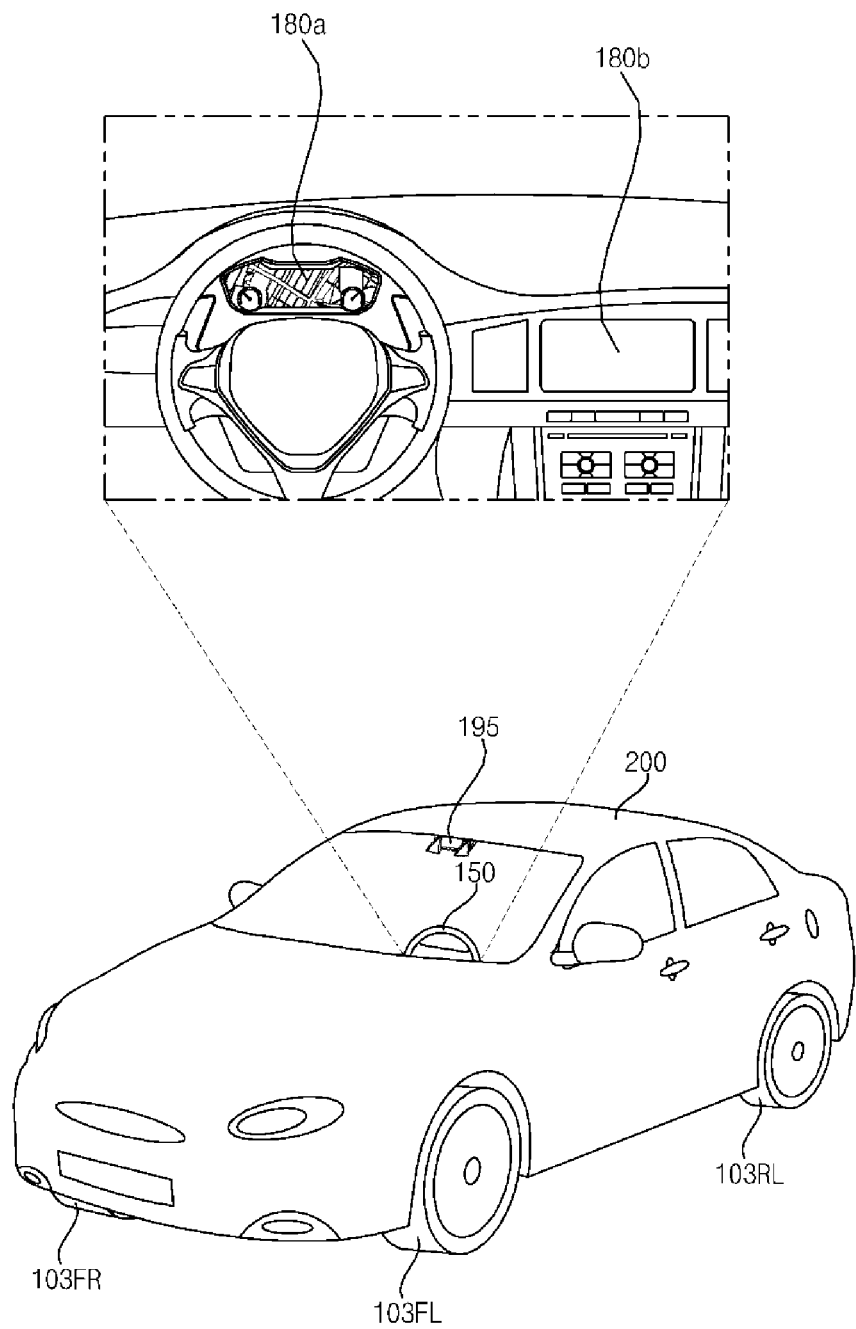
FIG. 1A is a view showing an example of the exterior and interior of a vehicle.

FIG. 1A is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

The embodiment of the present disclosure proposes a scheme for a display apparatus 100 for vehicle including a plurality of displays 180a and 180b to divide data processing. This will be described with reference to FIG. 12 and subsequent figures.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
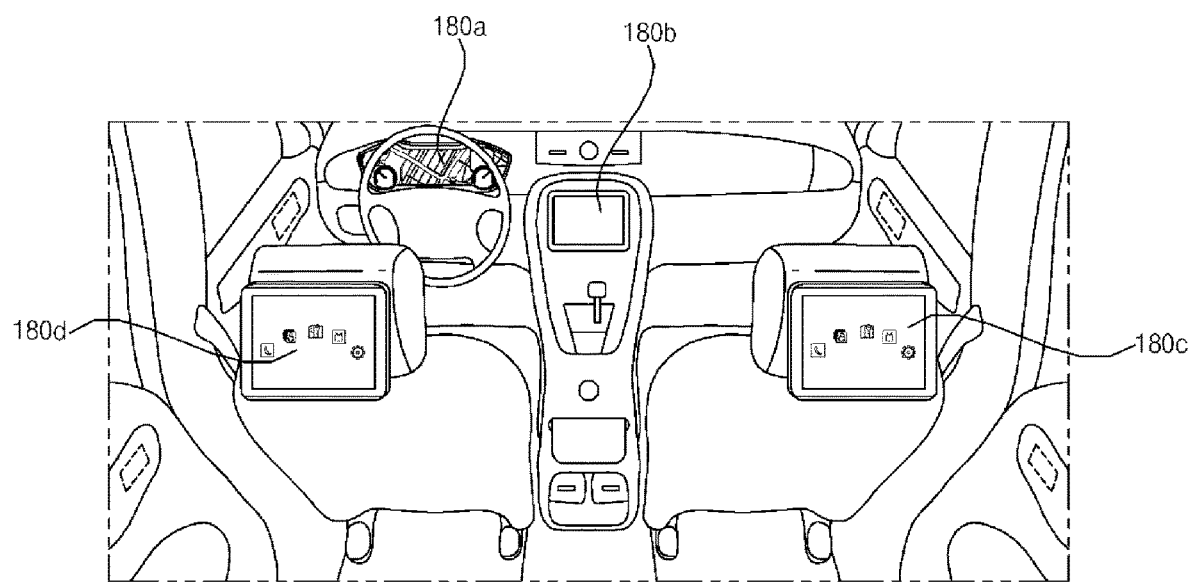
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) may be located in the vehicle.

The embodiment of the present disclosure proposes a scheme for a display apparatus 100 for vehicle including a plurality of displays 180a to 180d to divide data processing. This will be described with reference to FIG. 12 and subsequent figures.

Figure 2:
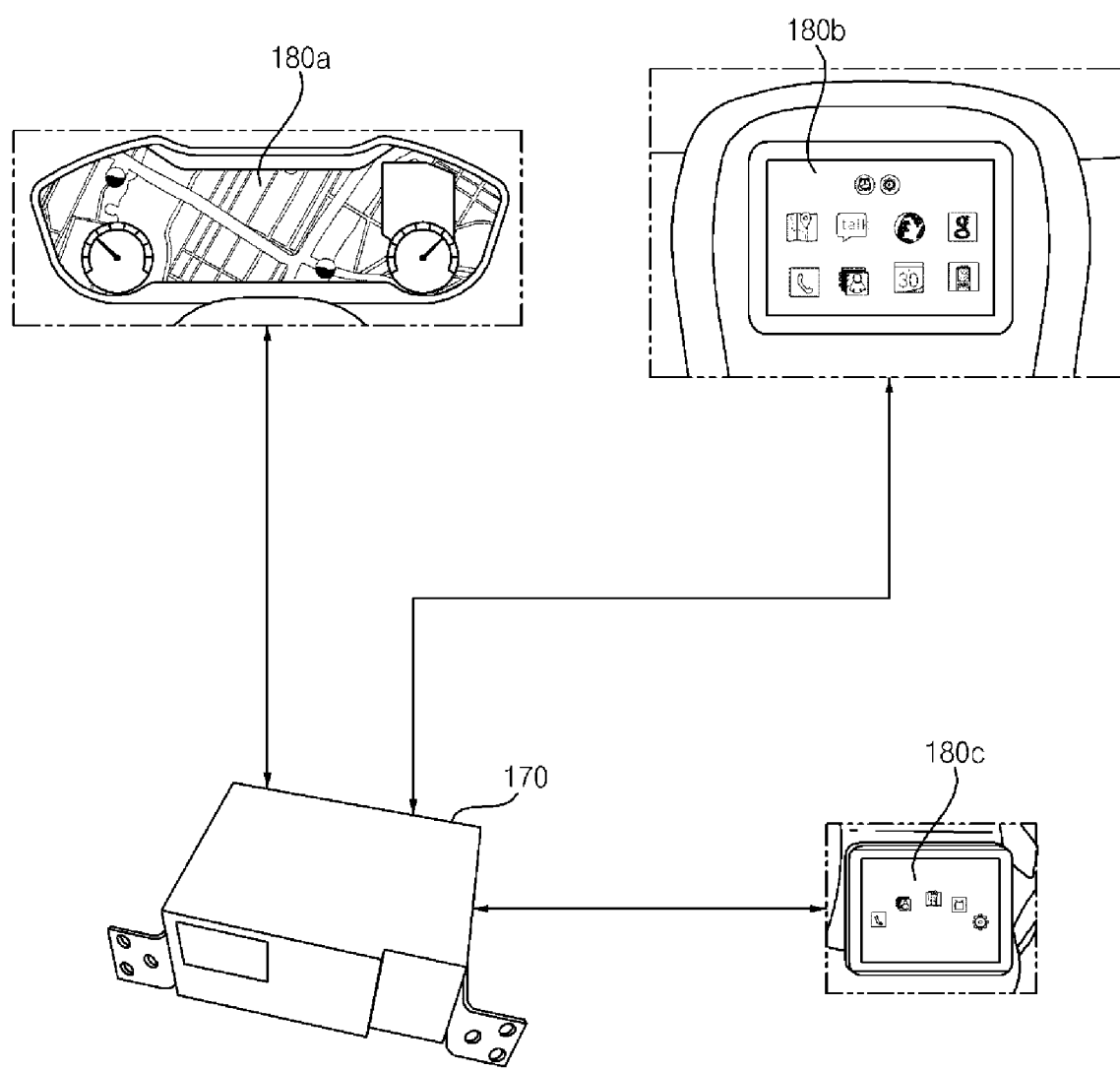
FIG. 2 is a view showing the external appearance of a display apparatus for vehicle according to an embodiment of the present disclosure.

FIG. 2 is a view showing the external appearance of a display apparatus for vehicle according to an embodiment of the present disclosure.

The display apparatus 100 for vehicle according to the embodiment of the present disclosure may include a plurality of displays 180a and 180b and a signal processing device 170 configured to perform signal processing in order to display images and information on the plurality of displays 180a and 180b.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

The signal processing device 170 may have a processor 175 provided therein, and first to third virtual machines 520 to 540 may be executed by a hypervisor 505 in the processor 175.

The second virtual machine 530 may be operated for the first display 180a, and the third virtual machine 540 may be operated for the second display 180b.

Meanwhile, the first virtual machine 520 in the processor 175 shares at least some of data with the second virtual machine 530 and the third virtual machine 540 for processing of divided data. Consequently, the plurality of virtual machines for the plurality of displays in the vehicle may divide and process data.

Meanwhile, the first virtual machine 520 in the processor 175 may receive and process wheel speed sensor data of the vehicle, and may transmit the processed wheel speed sensor data to at least one of the second virtual machine 530 or the third virtual machine 540. Consequently, at least one virtual machine may share the wheel speed sensor data of the vehicle.

Meanwhile, the first virtual machine 520 in the processor 175 writes some of data in a first shared memory 508a to be transmitted to the second virtual machine 530, and write some other of data in the first shared memory 508a to be transmitted to the third virtual machine 540. The second virtual machine 530 and the third virtual machine 540 are configured to process the received data, and write the processed data in a second shared memory 508b. Consequently, the plurality of virtual machines for the plurality of displays in the vehicle may divide and process data.

Meanwhile, the first virtual machine 520 in the processor 175 may be configured to set a shared memory 508 based on the hypervisor 505 for transmission of the same data to the second virtual machine 530 and the third virtual machine 540. Consequently, the first display 180a and the second display 180b in the vehicle may display the same information or the same images in a synchronized state.

Meanwhile, the display apparatus 100 for vehicle according to the embodiment of the present disclosure may further include a rear seat entertainment (RSE) display 180c configured to display driving state information, simple navigation information, various kinds of entertainment information, or an image.

The signal processing device 170 may further execute a fourth virtual machine 550 (see FIG. 12), in addition to the first to third virtual machines 520 to 540, on the hypervisor 505 in the processor 175 to control the RSE display 180c.

Consequently, it is possible to control various displays 180a to 180c using a single signal processing device 170.

Meanwhile, some of the plurality of displays 180a to 180c may be operated based on a Linux Operating System (OS), and others may be operated based on a Web Operating System (OS).

The signal processing device 170 according to the embodiment of the present disclosure may divide and process data for the displays 180a to 180c configured to be operated under various operating systems.

Meanwhile, the signal processing device 170 according to the embodiment of the present disclosure may be configured to display the same information or the same image in a synchronized state even if the displays 180a to 180c are operated under various operating systems.

Figure 3:
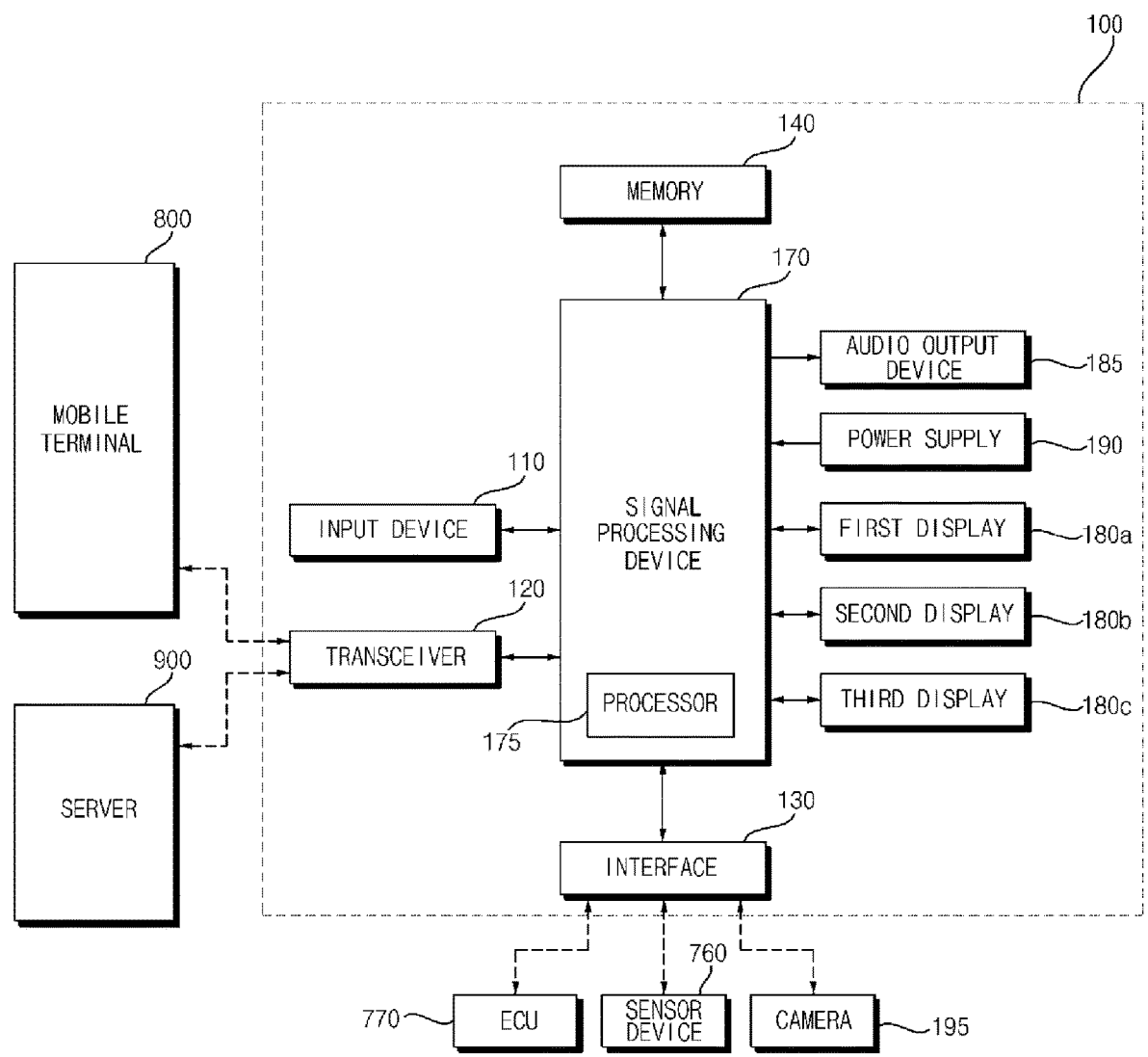
FIG. 3 illustrates an example of an internal block diagram of the display apparatus for vehicle of FIG. 2.

FIG. 3 illustrates an example of an internal block diagram of the display apparatus for vehicle according to the embodiment of the present disclosure.

Referring to the figure, the display apparatus 100 for vehicle according to the embodiment of the present disclosure may include an input device 110, a transceiver 120, an interface 130, a memory 140, a signal processing device 170, a plurality of displays 180a to 180c, an audio output device 185, and a power supply 190.

The input device 110 may include a physical button or pad for button input or touch input.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal of a vehicle driver. Any of various data communication schemes, such as Bluetooth, Wi-Fi, WIFI Direct, and APIX, may be used as a wireless data communication scheme.

The transceiver 120 may receive weather information and road traffic situation information, such as transport protocol expert group (TPEG) information, from the mobile terminal 800 or the server 900. To this end, the transceiver 120 may include a mobile communication module (not shown).

The interface 130 may receive sensor information from an electronic control unit (ECU) 770 or a sensor device 760, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195 or lidar (not shown), and may transmit the received information to the signal processing device 170.

The memory 140 may store various data necessary for overall operation of the display apparatus 100 for vehicle, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicle.

For example, the signal processing device 170 may include a processor 175 configured to perform signal processing for the displays 180*a* and 180*b*.

The processor 175 may execute the first to third virtual machines 520 to 540 on the hypervisor 505 (see FIG. 5) in the processor 175.

Among the first to third virtual machines 520 to 540 (see FIG. 5), the first virtual machine 520 may be called a server virtual machine, and the second and third virtual machines 530 and 540 may be called guest virtual machines.

The second virtual machine 530 may be operated for the first display 180*a*, and the third virtual machine 540 may be operated for the second display 180*b*.

For example, the first virtual machine 520 in the processor 175 may receive, process, and output at least one of vehicle sensor data, position information data, camera image data, audio data, or touch input data. Data processed only by a legacy virtual machine and data processed by the first virtual machine 520 may be distinguished from each other, whereby data processing may be efficiently performed. In particular, the first virtual machine 520 may be configured to process most of the data, whereby 1:N data sharing may be achieved.

As another example, the first virtual machine 520 may directly receive and process CAN communication data, audio data, radio data, USB data, and wireless communication data for the second and third virtual machines 530 and 540.

The first virtual machine 520 may transmit the processed data to the second and third virtual machines 530 and 540.

Consequently, only the first virtual machine 520, among the first to third virtual machines 520 to 540, may receive communication data and external input data, and may perform signal processing, whereby load in signal processing by the other virtual machines may be reduced and 1:N data communication may be achieved, and therefore synchronization at the time of data sharing may be achieved.

Meanwhile, the first virtual machine 520 in the processor 175 writes some of data in the first shared memory 508*a* to be transmitted to the second virtual machine 530, and write some other of data in the first shared memory 508*a* to be transmitted to the third virtual machine 540. The second virtual machine 530 and the third virtual machine 540 are configured to process the received data, and write the processed data in the second shared memory 508*b*. Consequently, the plurality of virtual machines for the plurality of displays in the vehicle may divide and process data.

At this time, data may be any one of image data, audio data, navigation data, and voice recognition data.

Meanwhile, the first virtual machine 520 may be configured to process some other of data, and write the processed data in the second shared memory 508*b*. That is, the first virtual machine 520 may perform data processing in addition to the second virtual machine 530 and the third virtual machine 540.

Meanwhile, when a fourth virtual machine 550 configured to be operated for the third display 180*c* is executed in the processor 175, the first virtual machine 520 may write some other of data in the first shared memory 508*a*, and the fourth virtual machine 550 may be configured to process the received data and write the processed data in the second shared memory 508*b*.

Meanwhile, the first virtual machine 520 may create command queues for distributed processing of data in the second virtual machine 530 and the third virtual machine 540. Consequently, the plurality of virtual machines may divide and process data.

Meanwhile, when the second virtual machine 530 and the third virtual machine 540 share the same data, the first virtual machine 520 in the processor 175 may create one command queue. Consequently, the same data may be synchronized and shared.

Meanwhile, the first virtual machine 520 may create command queues corresponding to the number of virtual machines for distributed processing of data.

Meanwhile, the first virtual machine 520 may be configured to transmit at least some of data to at least one of the second virtual machine 530 or the third virtual machine 540 for distributed processing of data.

For example, the first virtual machine 520 may allocate the first shared memory 508*a* for transmitting at least some of data to at least one of the second virtual machine 530 or the third virtual machine 540, and image data processed by the second virtual machine 530 or the third virtual machine 540 may be written in the second shared memory 508*b*.

Meanwhile, the first virtual machine 520 may be configured to write data in the shared memory 508, whereby the second virtual machine 530 and the third virtual machine 540 share the same data.

For example, the first virtual machine 520 may be configured to write radio data or wireless communication data in the shared memory 508, whereby the second virtual machine 530 and the third virtual machine 540 share the same data. Consequently, 1:N data sharing may be achieved.

Eventually, the first virtual machine 520 may be configured to process most of the data, whereby 1:N data sharing may be achieved.

Meanwhile, the first virtual machine 520 in the processor 175 may be configured to set the shared memory 508 based on the hypervisor 505 in order to transmit the same data to the second virtual machine 530 and the third virtual machine 540.

That is, the first virtual machine 520 in the processor 175 may transmit the same data to the second virtual machine 530 and the third virtual machine 540 in a synchronized state using the shared memory 508 based on the hypervisor 505. Consequently, the plurality of displays 180*a* and 180*b* in the vehicle may display the same images in a synchronized state.

Meanwhile, the signal processing device 170 may be configured to process various signals, such as an audio signal, an image signal, and a data signal. To this end, the signal processing device 170 may be implemented in the form of a system on chip (SOC).

Figure 4:
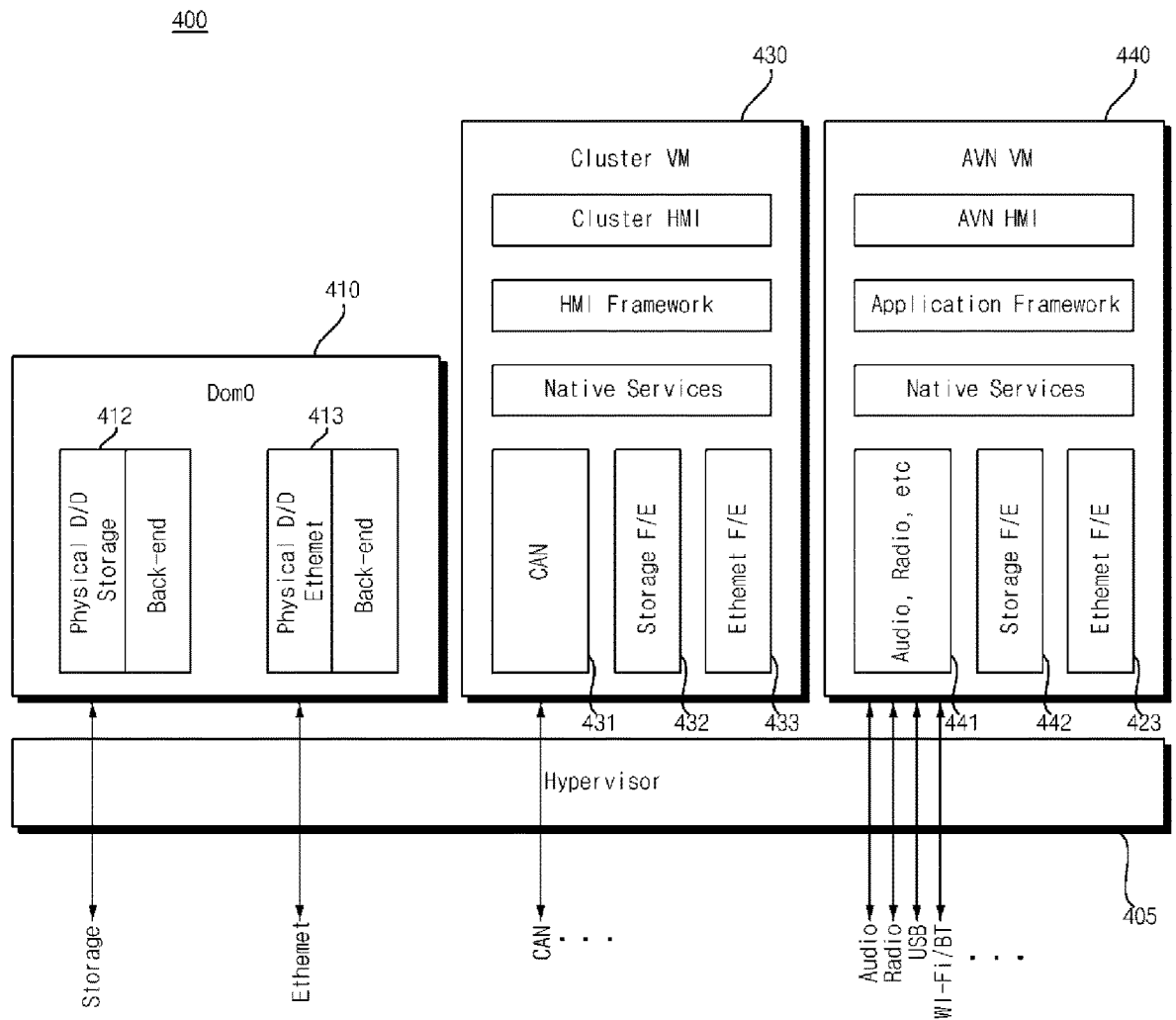
FIG. 4 is a view showing a system driven in a signal processing device related to the present disclosure.

FIG. 4 is a view showing a system driven in a signal processing device related to the present disclosure.

Referring to the figure, FIG. 4 is a view illustrating that virtual machines are used for the cluster display 180*a* and the AVN display 180*b*.

The system 400 driven in the signal processing device of FIG. 4 illustrates that a cluster virtual machine 430 and an AVN virtual machine 440 are executed through a hypervisor 405 in the processor 175.

Meanwhile, the system 400 driven in the signal processing device of FIG. 4 illustrates that a legacy virtual machine 410 is also executed on the hypervisor 405 in the processor 175.

The legacy virtual machine 410 may include an interface 412 for data communication with the memory 140 and an interface 413 for Ethernet communication.

Meanwhile, the cluster virtual machine 430 may include an interface 431 for CAN communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that CAN communication data are input and output only in the cluster virtual machine 430, whereby the CAN communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines such that various memory data and communication data are input and output not in the guest virtual machines but in the server virtual machine. This will be described with reference to FIG. 5 and subsequent figures.

Figure 5:
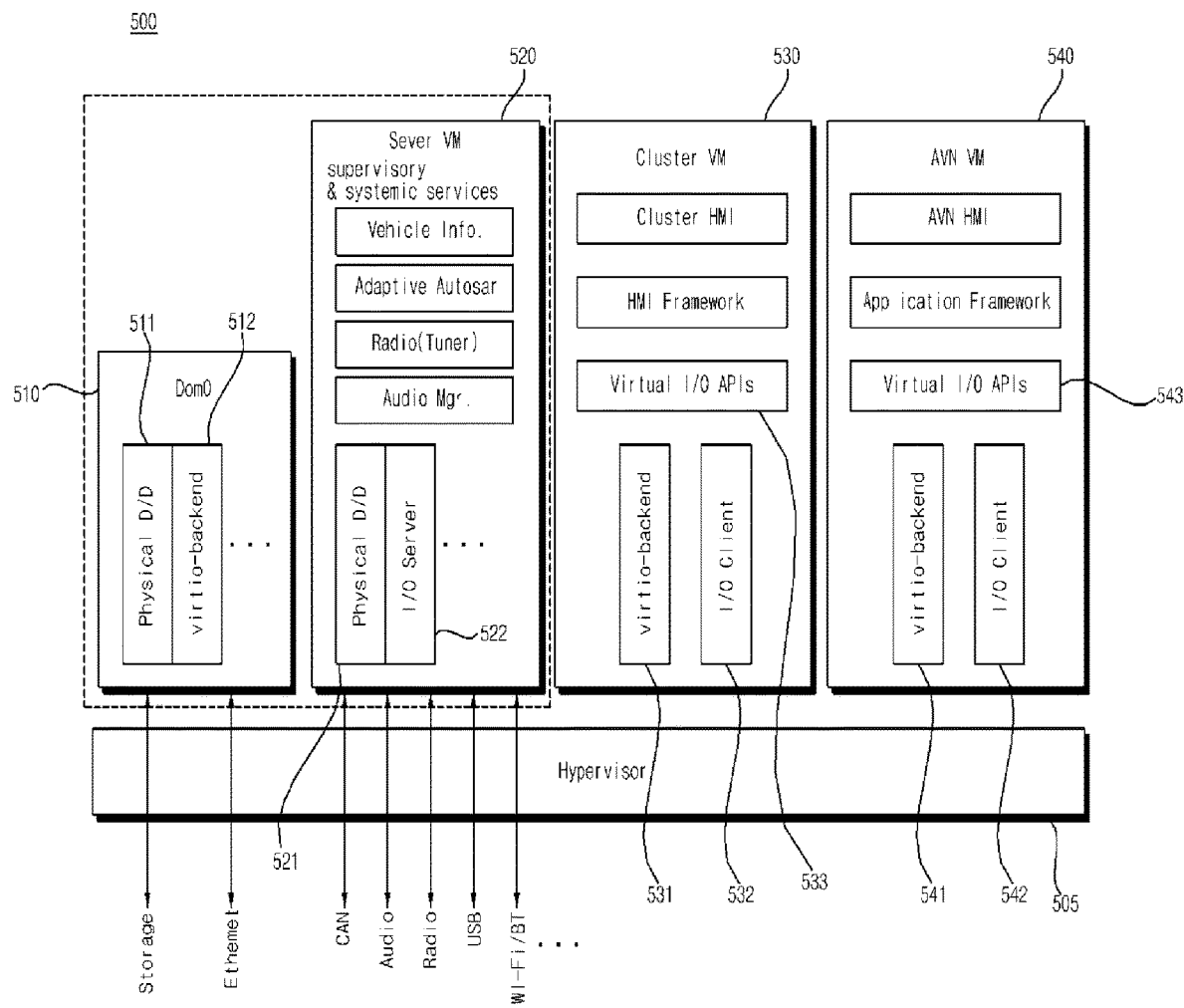
FIG. 5 is a view showing an example of a system driven in a signal processing device according to an embodiment of the present disclosure.

FIG. 5 is a view showing an example of a system driven in a signal processing device according to an embodiment of the present disclosure.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 may be a virtual machine for the cluster display 180*a*, and the third virtual machine 540 may be a virtual machine for the AVN display 180*b*.

That is, the second virtual machine 530 and the third virtual machine 540 may be operated for image rendering of the cluster display 180*a* and the AVN display 180*b*, respectively.

Meanwhile, the system 50 driven in the signal processing device 170 of FIG. 5 illustrates that a legacy virtual machine 510 is also executed on the hypervisor 505 in the processor 175.

The legacy virtual machine 510 may include an interface 511 for data communication with the memory 140 and Ethernet communication.

Meanwhile, the legacy virtual machine 510 may further include a virtio-backend interface 512 for data communication with the second and third virtual machines 530 and 540.

The first virtual machine 520 may include an interface 521 for input and output of audio data, radio data, USB data, and wireless communication data and an input and output server interface 522 for data communication with the guest virtual machines.

That is, the first virtual machine 520, which is a server virtual machine, may provide inputs/outputs (I/O) difficult to virtualize with standard virtualization technology (VirtIO) to a plurality of guest virtual machines, such as the second and third virtual machines 530 and 540.

Meanwhile, the first virtual machine 520, which is a server virtual machine, may control radio data and audio data at a supervisor level, and may provide the data to a plurality of guest virtual machines, such as the second and third virtual machines 530 and 540.

Meanwhile, the first virtual machine 520, which is a server virtual machine, may be configured to process vehicle data, sensor data, and surroundings-of-vehicle information, and may provide the processed data or information to a plurality of guest virtual machines, such as the second and third virtual machines 530 and 540.

Meanwhile, the first virtual machine 520 may provide supervisory services, such as processing of vehicle data and audio routing management.

Next, the second virtual machine 530 may include an input and output client interface 532 for data communication with the first virtual machine 520 and APIs 533 configured to control the input and output client interface 532.

In addition, the second virtual machine 530 may include a virtio-backend interface for data communication with the legacy virtual machine 510.

The second virtual machine 530 may receive memory data by communication with the memory 140 and Ethernet data by Ethernet communication from the virtio-backend interface 512 of the legacy virtual machine 510 through the virtio-backend interface.

Next, the third virtual machine 540 may include an input and output client interface 542 for data communication with the first virtual machine 520 and APIs 543 configured to control the input and output client interface 542.

In addition, the third virtual machine 540 may include a virtio-backend interface for data communication with the legacy virtual machine 510.

The third virtual machine 540 may receive memory data by communication with the memory 140 and Ethernet data by Ethernet communication from the virtio-backend interface 512 of the legacy virtual machine 510 through the virtio-backend interface.

Meanwhile, the legacy virtual machine 510 may be provided in the first virtual machine 520, unlike FIG. 5.

In the system 500, CAN communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, audio data, radio data, USB data, and wireless communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Meanwhile, in the system 500 of FIG. 5, the second and third virtual machines 530 and 540 may be operated based on different operating systems.

For example, the second virtual machine 530 may be operated based on a Linux OS, and the third virtual machine 540 may be operated based on a Web OS.

In the first virtual machine 520, the shared memory 508 based on the hypervisor 505 is set for data sharing, even though the second and third virtual machines 530 and 540 are operated based on different operating systems. Even though the second and third virtual machines 530 and 540 are operated based on different operating systems, therefore, the same data or the same images may be shared in a synchronized state. Eventually, the plurality of displays 180a and 180b may display the same data or the same images in a synchronized state.

Figure 6:
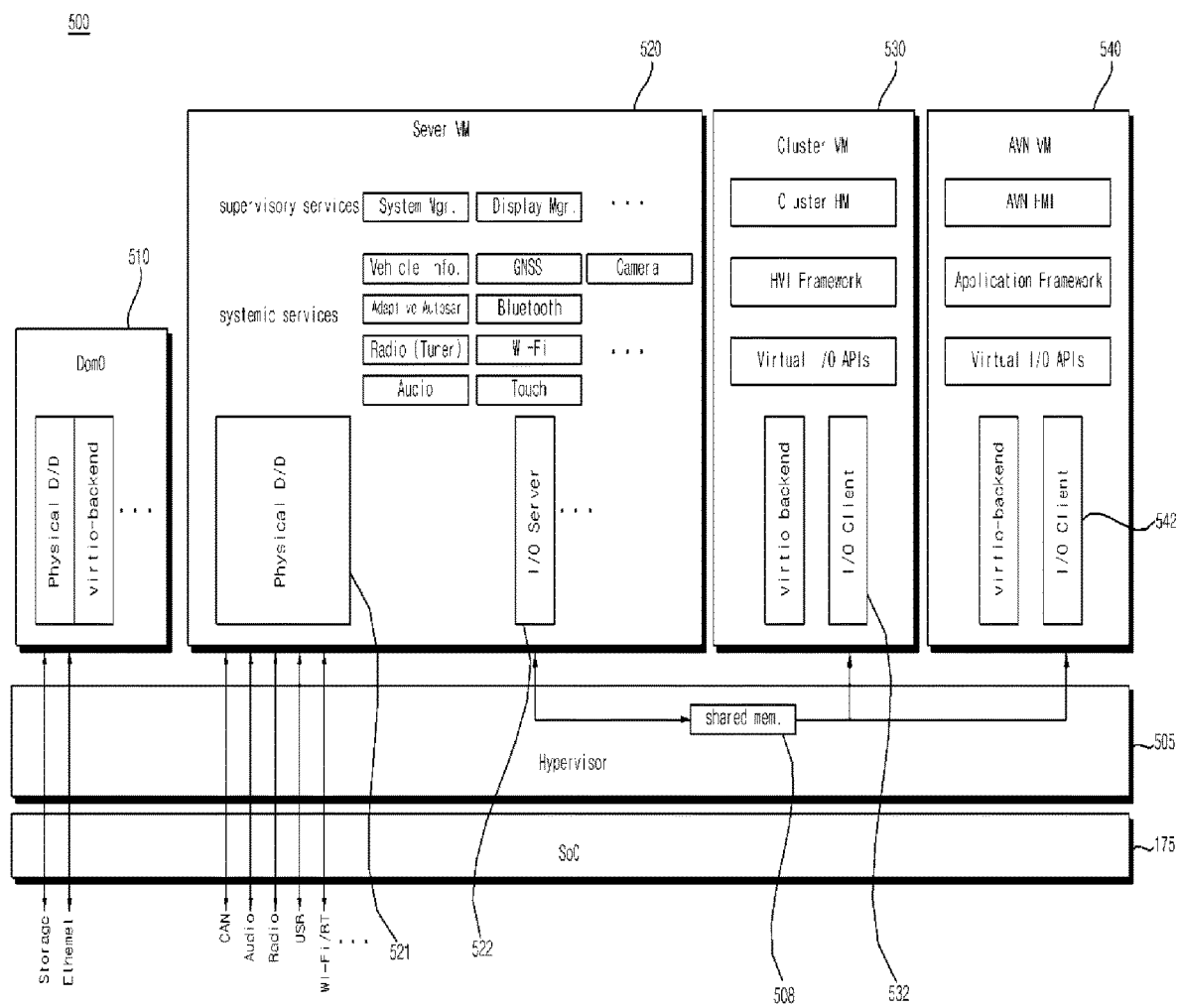
FIG. 6 is a view referred to in the description of operation of the system driven in the signal processing device according to the embodiment of the present disclosure.

FIG. 6 is a view referred to in the description of operation of the system driven in the signal processing device according to the embodiment of the present disclosure, and FIGS. 7A to 18 are views referred to in the description of FIG. 5 or 6.

First, in the system 500 of FIG. 6, the processor 175 in the signal processing device 170 executes the first to third virtual machines 520 to 540 on the hypervisor 505 in the processor 175, and the first virtual machine 520 in the processor 175 is configured to set the shared memory 508 based on the hypervisor 505 for transmission of the same data to the second and third virtual machines 530 and 540.

For example, the same image data may be illustrated as the same data. Consequently, the plurality of displays 180a and 180b in the vehicle may display the same images in a synchronized state.

Meanwhile, in the system 500 of FIG. 6, the processor 175 in the signal processing device 170 executes the first to third virtual machines 520 to 540 on the hypervisor 505 in the processor 175, and the first virtual machine 520 in the processor 175 may transmit the same data to the second and third virtual machines 530 and 540 in a synchronized state using the shared memory 508 based on the hypervisor 505.

For example, CAN communication data, audio data, radio data, USB data, wireless communication data, position information data, or touch data may be illustrated as the same data. Consequently, the plurality of displays 180a and 180b in the vehicle may display the same data in a synchronized state.

Meanwhile, although not shown in FIG. 6, the legacy virtual machine 510 may transmit memory data from the memory 140 and Ethernet data by Ethernet communication to the second and third virtual machines 530 and 540 in a synchronized state using the shared memory 508 based on the hypervisor 505. That is, it is possible to perform 1:N data communication with respect to the memory data or the Ethernet data, whereby it is possible to transmit the same data in a synchronized state.

Figure 7A:
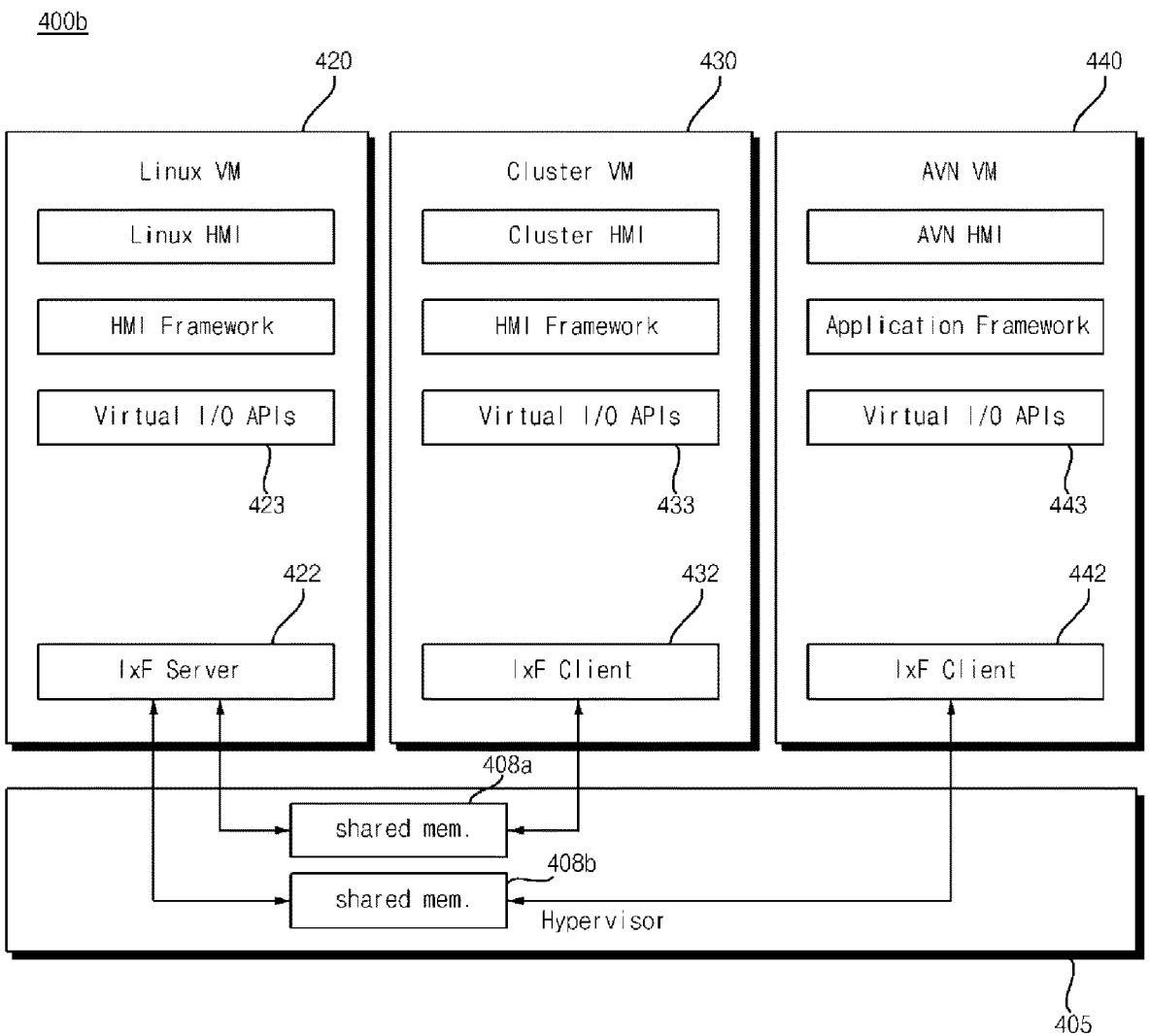
FIGS. 7A to 18 are views referred to in the description of FIG. 5 or 6.

FIG. 7A illustrates that three virtual machines 420, 430, and 440 are operated in a system 400b.

Referring to the figure, the first virtual machine 420, which is a Linux-based virtual machine, may include an input and output server interface 422 for data transmission, and the second virtual machine 430 and the third virtual machine 440 may include input and output client interfaces 432 and 442 for data communication with the input and output server interface 422, respectively.

For example, the first virtual machine 420 must set a first shared memory 408a in a hypervisor 405 in order to transmit first data to the second virtual machine 430, and the first virtual machine 420 must set a second shared memory 408b different from the first shared memory 408a in the hypervisor 405 in order to transmit the same first data to the third virtual machine 440.

In the case in which the same first data are transmitted, there is a disadvantage in that resources are wasted and synchronization is not easy in the case in which an additional shared memory is used, as shown in FIG. 7A.

Figure 7B:
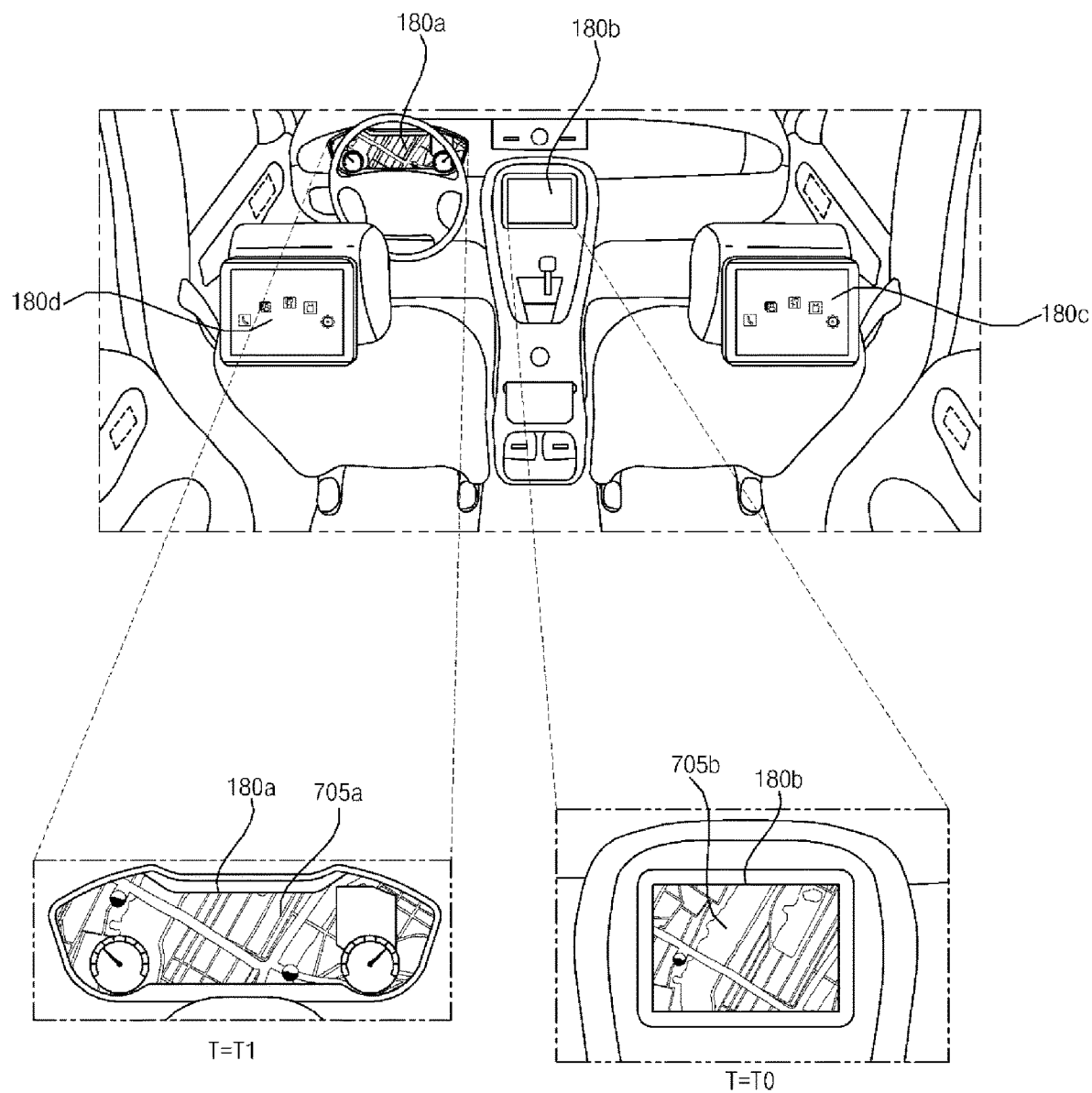

FIG. 7B illustrates that, by the system 400b of FIG. 7A, the second virtual machine 430 displays image data received through the first shared memory 408a on the first display 180a, and the third virtual machine 440 displays image data received through the second shared memory 408b on the second display 180b.

FIG. 7B illustrates that an image 705a displayed on the first display 180a and an image 705b displayed on the second display 180b are not synchronized with each other and that the image 705b displayed on the second display 180b corresponds to a more previous frame than the image 705a displayed on the first display 180a.

When the first virtual machine 420 transits the same image data, as described above, synchronization cannot be performed at the time of display of the image, as shown in FIG. 7B, in the case in which an additional shared memory is used, as shown in FIG. 7A.

In order to solve this problem, the present disclosure proposes a scheme for assigning a single shared memory at the time of transmission of the same data. Consequently, 1:N data communication is performed, whereby synchronized data transmission is achieved.

Figure 8:
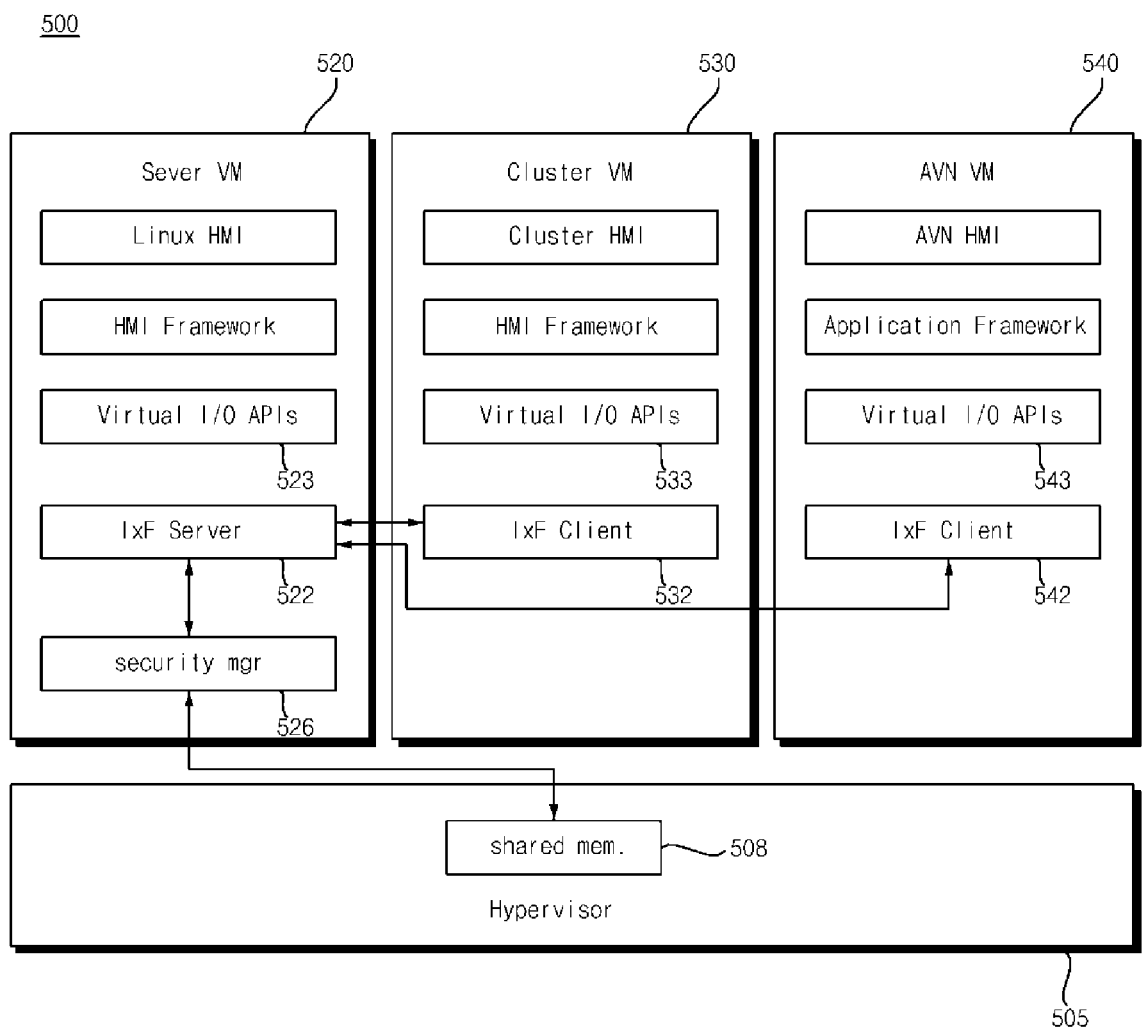

FIG. 8 illustrates that the first to third virtual machines 520 to 540 are executed on the hypervisor 505 in the processor 175 of the system 500 according to the present disclosure and that the first virtual machine 520 in the processor 175 is configured to set the shared memory 508 based on the hypervisor 505 in order to transmit the same data to the second virtual machine 530 and the third virtual machine 540.

Consequently, the first display 180a and the second display 180b in the vehicle may display the same images in a synchronized state.

Meanwhile, high-speed data communication may be performed between the plurality of virtual machines. Furthermore, high-speed data communication may be performed even though the plurality of virtual machines is driven by different operating systems.

Meanwhile, the first virtual machine 520 in the processor 175 may not allocate memories corresponding in number to the virtual machines but may use a single shared memory 508, not memory allocation when transmitting the data processed by the first virtual machine 520 to another virtual machine. Consequently, 1:N data communication using the shared memory 508, not 1:1 data communication, may be performed between the virtual machines.

Meanwhile, the first virtual machine 520 in the processor 175 may include an input and output server interface 522 and a security manager 526.

Meanwhile, the second virtual machine 530 and the third virtual machine 540 may include input and output client interfaces 532 and 542, respectively. Consequently, high-speed data communication between the plurality of virtual machines may be performed using the input and output server interface 522 and the input and output client interfaces 532 and 542.

The input and output server interface 522 in the first virtual machine 520 may receive requests for transmission of the same data from the input and output client interfaces 532 and 542 in the second virtual machine 530 and the third virtual machine 540, and may transmit shared data to the shared memory 508 through the security manager 526 based thereon.

Figure 9A:
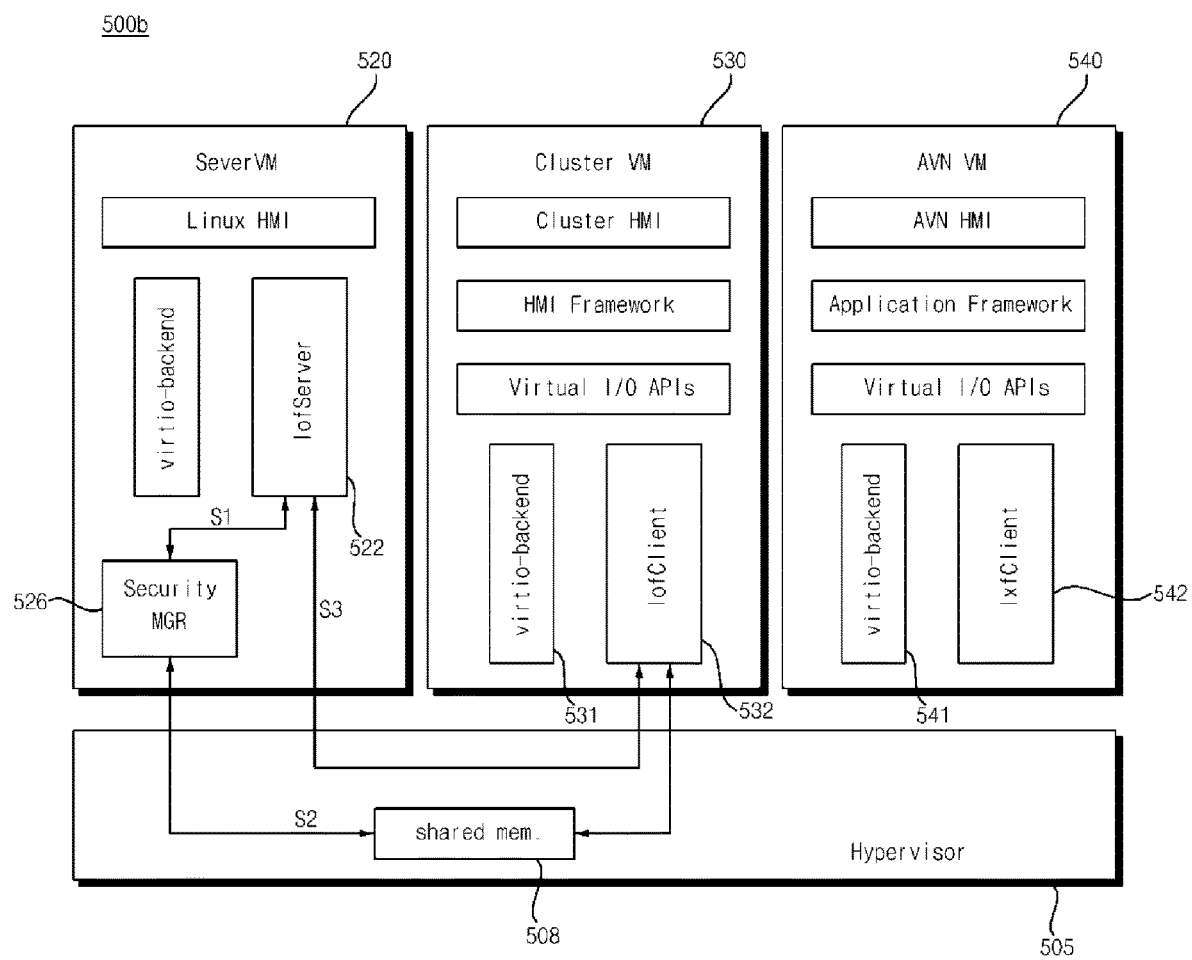

FIG. 9A is a view illustrating transmission of shared data in more detail.

Referring to the figure, in order to transmit shared data, the input and output server interface 522 in the first virtual machine 520 transmits a request for allocation of the shared memory 508 to the security manager 526 (S1).

Subsequently, the security manager 526 may allocate the shared memory 508 using the hypervisor 505 (S2), and write shared data in the shared memory 508.

Meanwhile, the input and output client interfaces 532 and 542 may transmit a request for connection to the input and output server interface 522 after allocation of the shared memory 508 (S3).

Meanwhile, the input and output server interface 522 transmits information regarding shared memory 508 including key data to the input and output client interfaces 532 and 542 after allocation of the shared memory 508 (S4). At this time, the key data may be private key data for data access.

Meanwhile, the first virtual machine 520 in the processor 175 may transmit information regarding the shared memory 508 to the second virtual machine 530 and the third virtual machine 540 after setting of the shared memory 508.

Subsequently, the input and output server interface 522 in the first virtual machine 520 is configured to create a command or a command queue for event processing, other than data, to control distributed processing between the virtual machines (S5).

The figure illustrates that a command queue is created in a command queue buffer 504 in the hypervisor 505 under control of the input and output server interface 522. However, the present disclosure is not limited thereto, and the command queue may be created in the first virtual machine 520, not the hypervisor 505, under control of the input and output server interface 522.

Subsequently, the input and output client interfaces 532 and 542 access the command queue buffer 504 to receive the created command queue or information regarding the command queue (S6).

For example, when the commands transmitted to the input and output client interfaces 532 and 542 are the same, the created command queues may be the same.

As another example, when the commands transmitted to the input and output client interfaces 532 and 542 are different from each other, different command queues may be transmitted to the input and output client interfaces 532 and 542.

Subsequently, the input and output client interfaces 532 and 542 may access the shared memory 508 based on the received key data (S5), and may copy the shared data from the shared memory 508 (S7).

Particularly, when the input and output client interfaces 532 and 542 receive the same shared data, the input and output client interfaces 532 and 542 may access the shared memory 508 based on the same command queues and the same key data (S5), and may copy the shared data from the shared memory 508.

Consequently, the second virtual machine 530 and the third virtual machine 540 may access the shared memory 508, and may eventually share the shared data.

For example, in the case in which the shared data are image data, the second virtual machine 530 and the third virtual machine 540 may share the image data, and eventually the plurality of displays 180a and 180b in the vehicle may display the same shared images in a synchronized state.

Figure 9B:
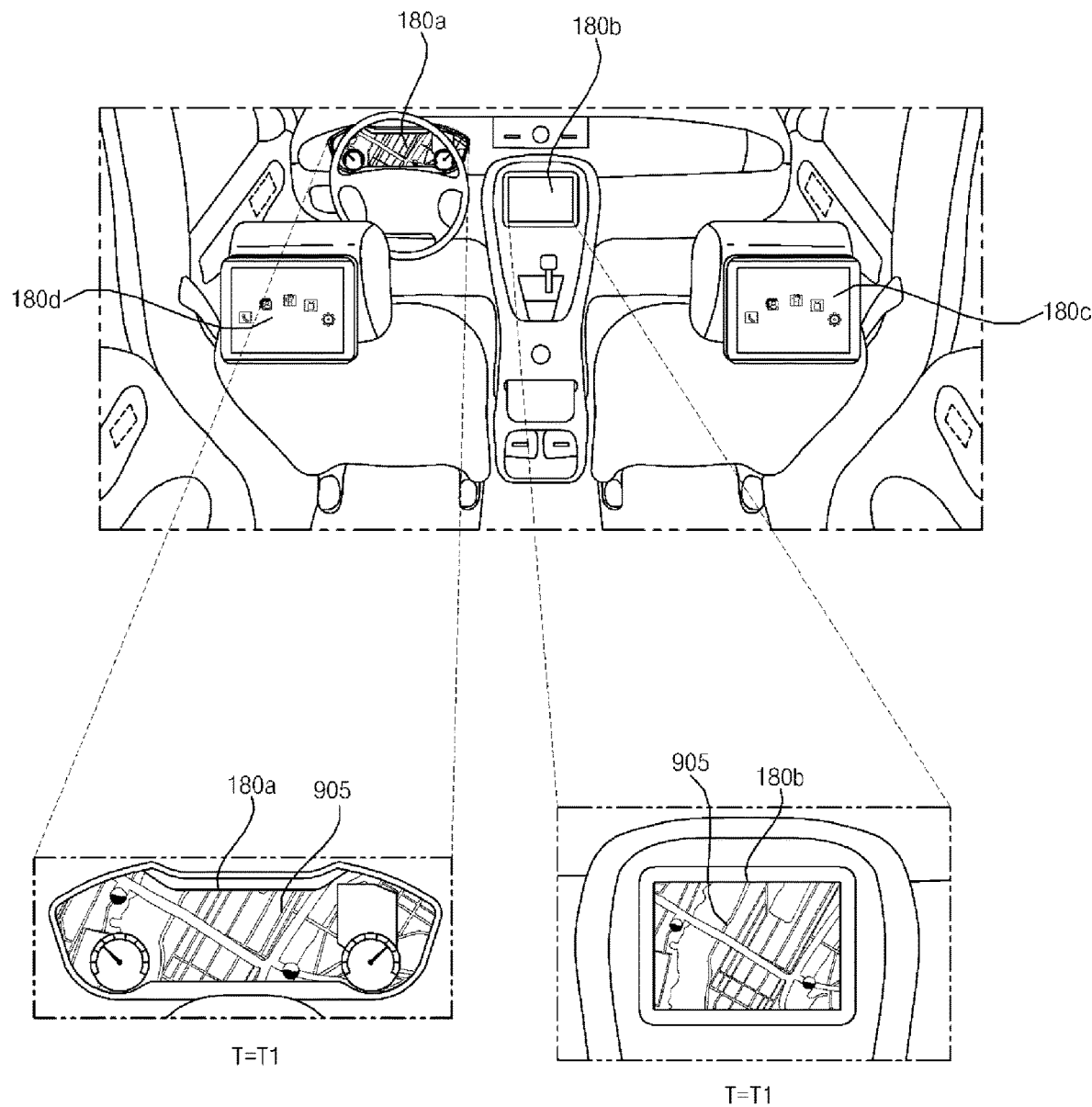

FIG. 9B illustrates that, by the system 500b of FIG. 9A, the second virtual machine 530 displays image data received through the shared memory 508 on the first display 180a, and the third virtual machine 540 displays image data received through the shared memory 508 on the second display 180b.

FIG. 9B illustrates that an image 905 displayed on the first display 180a and an image 905 displayed on the second display 180b are synchronized, whereby the same images are displayed.

That is, image data processed by the first virtual machine 520 in the processor 175 are transmitted to the second virtual machine 530 and the third virtual machine 540 through the shared memory 508, and the first image 905 displayed on the first display 180a and the second image 905 displayed on the second display 180b based on the image data may be the same. Consequently, the plurality of displays 180a and 180b in the vehicle may display the same images in a synchronized state. In addition, high-speed data communication between the plurality of virtual machines may be performed.

Figure 10:
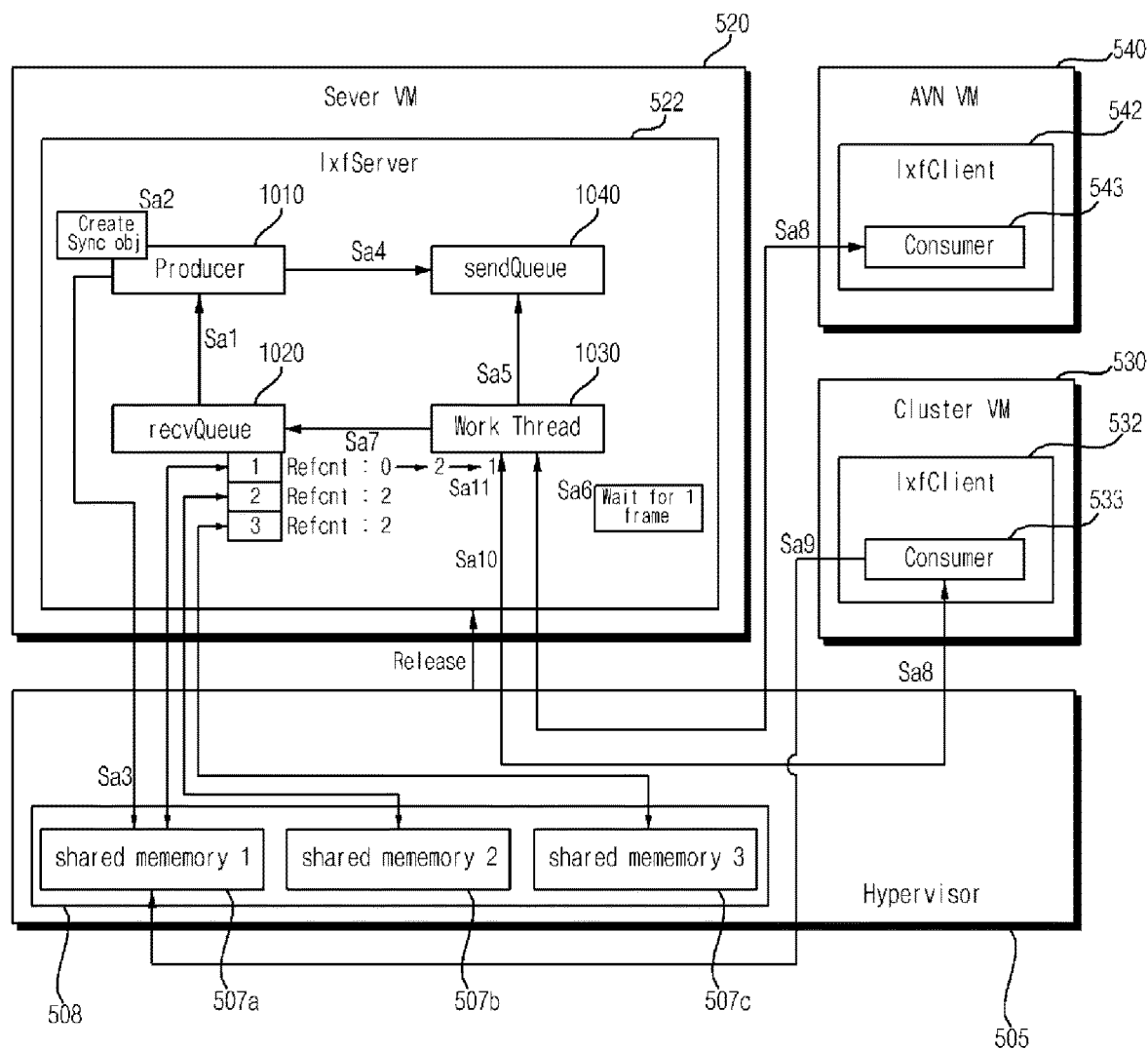

FIG. 10 is a view showing the output server interface 522 of FIG. 8 in detail.

Referring to the figure, a plurality of buffers 507a, 507b, and 507c may be set in the shared memory 508.

Meanwhile, the input and output client interfaces 532 and 542 in the second virtual machine 530 and the third virtual machine 540 may include consumers 533 and 543, respectively.

Meanwhile, the input and output server interface 522 in the first virtual machine 520 may include a producer 1010 configured to create a synchronization object for graphical synchronization, a recvQueue 1020 configured to manage, particularly receive, a queue, a WorkThread 1030 configured to manage a queue and to control operation of the queue, and a sendQueue 1040 configured to manage, particularly transmit, a queue.

First, the producer 1010 receives information regarding the index of an empty index, among the plurality of buffers 507a, 507b, and 507c in the shared memory 508, from the recvQueue 1020 (Sa1). For example, in the case in which the first buffer 507a, among the plurality of buffers 507a, 507b, and 507c, is empty, information regarding the first buffer 507a is received (Sa1).

In particular, the producer 1010 may receive information regarding the first buffer 507a having a reference count refcnt of 0 from the recvQueue 1020.

Next, the producer 1010 creates a synchronization object for graphical synchronization in order to perform writing in the first buffer 507a (Sa2).

Next, the producer 1010 writes data about the created synchronization object in the first buffer 507a in the shared memory 508 (Sa3).

Next, the producer 1010 queues information regarding the first buffer 507a, i.e. a buffer index, to the sendQueue 1040 (Sa4).

Next, in the case in which data are input to the sendQueue 1040, which is periodically monitored, the WorkThread 1030 senses and receives or reads the data (Sa5).

For example, in the case in which information regarding the first buffer 507a is input to the sendQueue 1040, which is monitored, the WorkThread 1030 receives the information.

Meanwhile, the WorkThread 1030 waits until a frame about the created synchronization object is completely drawn (Sa6).

Next, the WorkThread 1030 increases the reference count refcnt of the buffer corresponding to the first buffer 507a by the number of consumers or the number of input and output client interfaces (Sa7).

For example, since the number of consumers 533 and 543 or the number of input and output client interfaces 532 and 542 is two in the figure, the reference count refcnt of the buffer corresponding to the first buffer 507a is increased from 0 to 2.

Next, the WorkThread 1030 transmits the buffer index to the consumers 533 and 543 (Sa8). For example, information corresponding to the first buffer 507a is transmitted (Sa8).

Next, the consumers 533 and 543 access the first buffer 507a in the shared memory 508 using the received buffer index to copy data (Sa9).

Next, the consumers 533 and 543 return the buffer index to the producer 1010 or the WorkThread 1030 after completion of data copying (Sa10).

Next, the producer 1010 reduces the reference count refcnt of the first buffer 507a by 1 based on information or a buffer index received after completion of data copying for each of the consumers 533 and 543.

For example, in the case in which the first consumer 533 completes data copying, the reference count refcnt of the first buffer 507a is reduced from 2 to 1.

Subsequently, in the case in which the second consumer 543 completes data copying, the reference count refcnt of the first buffer 507a is reduced from 1 to 0.

Meanwhile, in the case in which the reference count refcnt of the first buffer 507a is 0, the buffer may be used by the producer 1010.

Similarly, first frame data may be shared using the first buffer 507a, then second frame data may be shared using the second buffer 507b, then third frame data may be shared using the third buffer 507c, and then fourth frame data may be shared using the first buffer 507a again.

That is, the input and output server interface 522 may receive information regarding the empty first buffer 507a in the shared memory 508, may write the first data in the first buffer 507a in the shared memory 508, and may transmit buffer information of the first buffer 507a to the input and output client interfaces 532 and 542 in the second virtual machine 530 and the third virtual machine 540.

In particular, the reference count of the first buffer 507a may be changed in a first direction (e.g. the reference count being increased) based on writing of the first data in the first buffer 507a, and in the case in which copying of the first data from the first buffer 507a is completed, the reference count of the first buffer 507a may be changed in a second direction, which is opposite the first direction, (e.g. the reference count being decreased).

For example, the consumers 533 and 543 in the input and output client interfaces 532 and 542 in the second virtual machine 530 and the third virtual machine 540 may change the reference count of the first buffer 507a in the first direction (e.g. the reference count being increased) based on writing of the first data in the first buffer 507a.

Meanwhile, in the case in which copying of the first data from the first buffer 507a is completed, the producer 1010 in the input and output server interface 522 in the first virtual machine 520 may change the reference count of the first buffer 507a in the second direction, which is opposite the first direction, (e.g. the reference count being decreased). After completion of copying, therefore, new data may be written in the first buffer 507a.

Meanwhile, the first virtual machine 520 may write first frame data to third frame data in the first buffer 507a to the third buffer 507c, respectively, and the input and output client interfaces 532 and 542 in the second virtual machine 530 and the third virtual machine 540 may sequentially copy the first frame data to the third frame data from the first buffer 507a to the third buffer 507c.

Meanwhile, after the input and output client interface 542 in the third virtual machine 540 copying the first frame data from the first buffer 507a is completed, the second virtual machine 530 may copy the second frame data from the second buffer 507b. Consequently, synchronization between the second virtual machine 530 and the third virtual machine 540 may be performed at the time of data sharing.

Figure 11A:
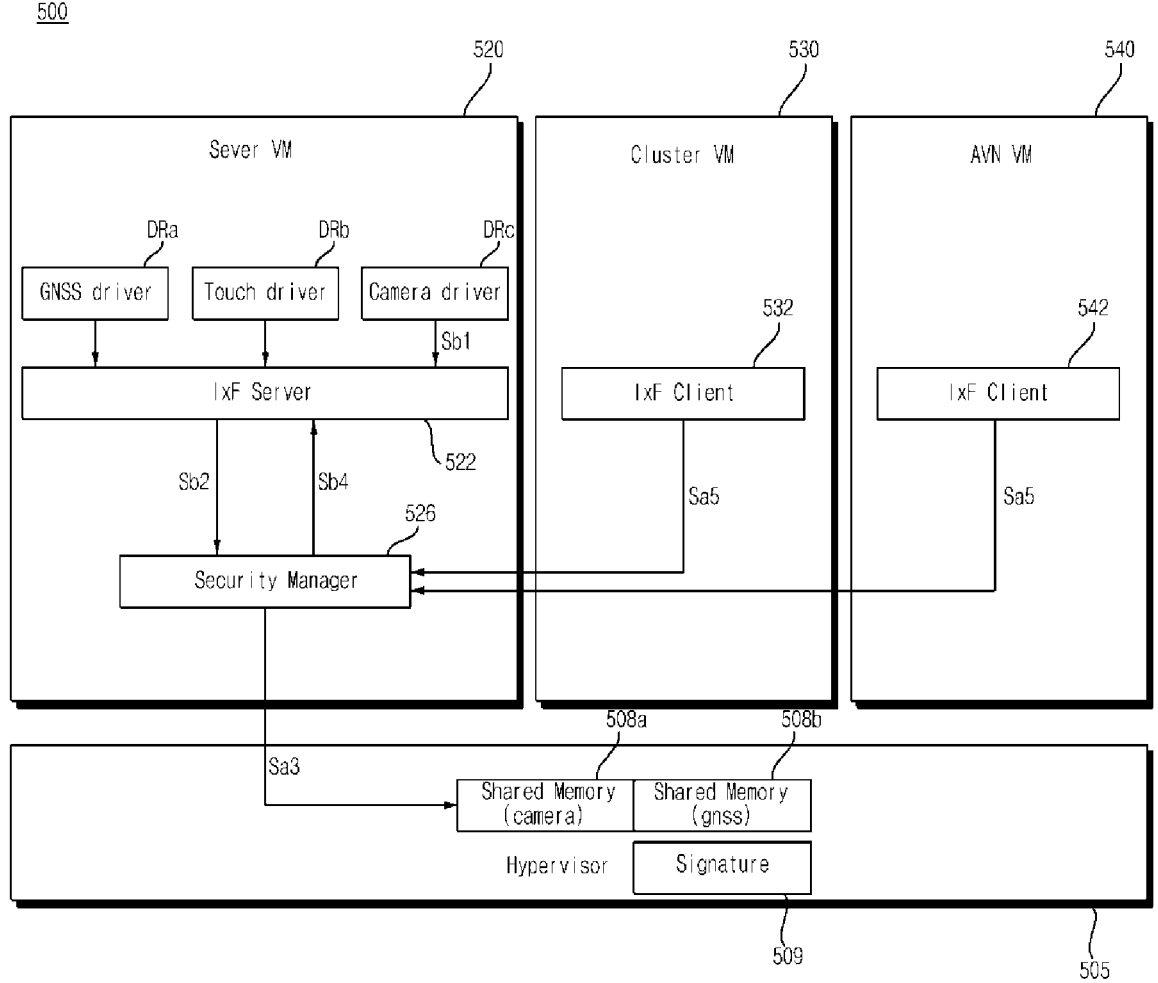

FIG. 11A is a view illustrating that various drivers DRa, DRb, and DRc are provided in the first virtual machine 520.

Referring to the figure, the first virtual machine 520 may include a position information driver DRa configured to process position information, a touch driver DRb configured to process touch input, and a camera driver DRc configured to process an image from the camera.

Consequently, the first virtual machine 520 may set the shared memory based on the hypervisor 505 for each of the position information driver DRa, the touch driver DRb, and the camera driver DRc.

Meanwhile, the input and output server interface 522 may set a first shared memory 508a for transmission of image data from the camera driver DRc, and may set a second shared memory 508b for transmission of position information from the position information driver DRa.

Meanwhile, key data of the first shared memory 508a and key data of the second shared memory 508b may be transmitted to the second virtual machine 530 and the third virtual machine 540, and the second virtual machine 530 and the third virtual machine 540 may access the first shared memory 508a and the second shared memory 508b based on the key data of the first shared memory 508a and the key data of the second shared memory 508b.

In the figure, the case in which data from the position information driver DRa and data from the camera driver DRc are shared is illustrated, and therefore two shared memories 508a and 508b are illustrated as the shared memories based on the hypervisor 505.

Since a shared memory is set for each of different kinds of shared data, as described above, it is possible to prevent data confusion at the time of data sharing and to perform high-speed data communication between the plurality of virtual machines.

FIG. 11B is a view showing a table including key data information.

Referring to the figure, when different kinds of shared data are shared, the security manager 526 may create key data information for sharing, and may create and register virtual machine information, information for each piece of equipment, allocated memory address information, buffer index information, and the created key data information in the form of a table.

Meanwhile, the input and output client interfaces 532 and 542 in the second virtual machine 530 and the third virtual machine 540 may be connected to the security manager 526, may request and receive key data with reference to the table in the security manager 526, and may access a corresponding one of the shared memories using the received key data.

Meanwhile, in the case in which data from the camera driver DRc are shared through the first shared memory 508a and in the case in which data from the position information driver DRa are shared through the second shared memory 508b, as shown in FIG. 11B, the virtual machine information in one case and the virtual machine information in the other case are the same to each other, but the information for each piece of equipment, the allocated memory address information, the buffer index information, and the created key data information in one case and the information for each piece of equipment, the allocated memory address information, the buffer index information, and the created key data information in the other case are different from each other.

Consequently, it is possible to prevent data confusion at the time of sharing of different kinds of data and to perform high-speed data communication between the plurality of virtual machines.

Figure 12:
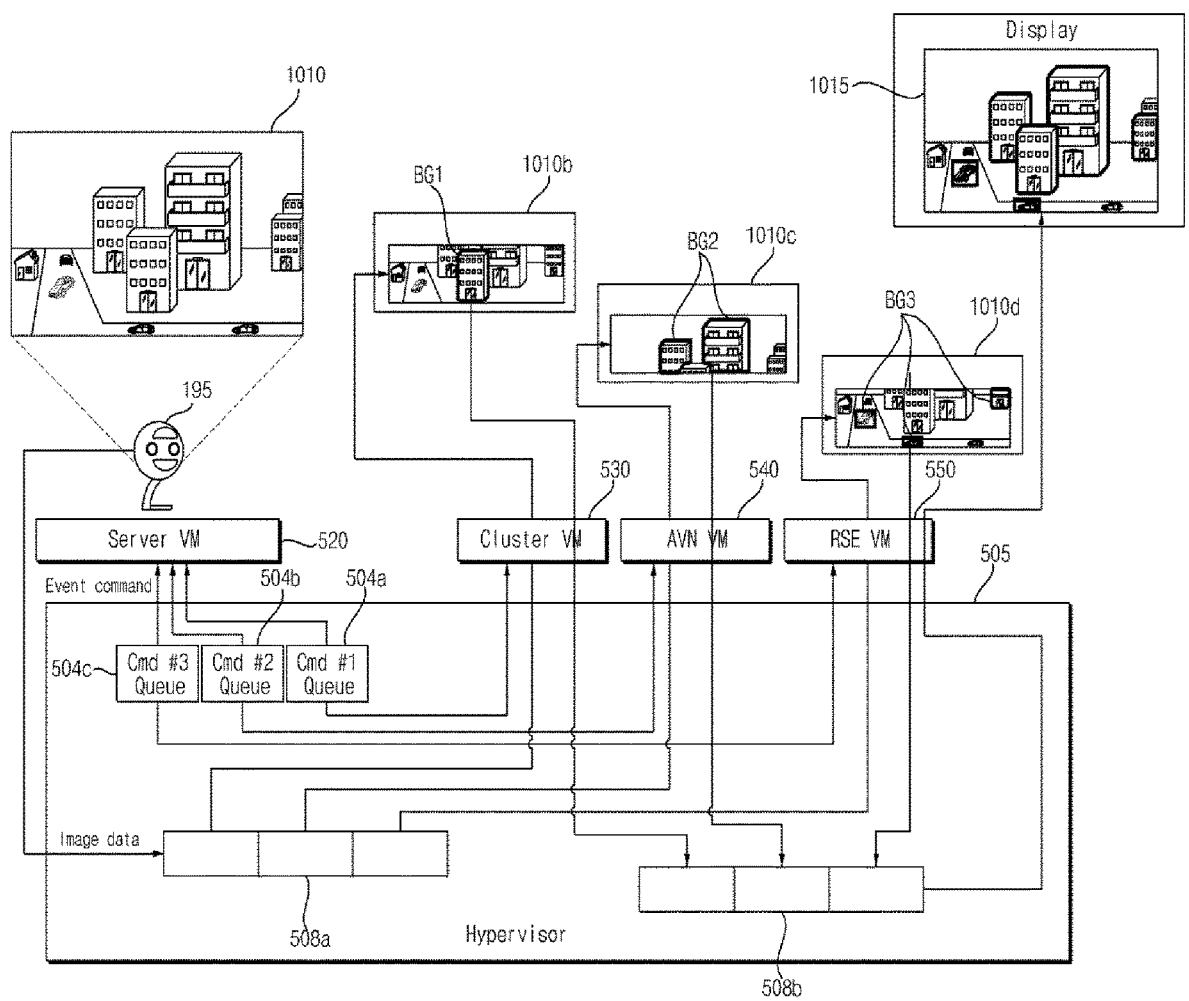
Figure 13:
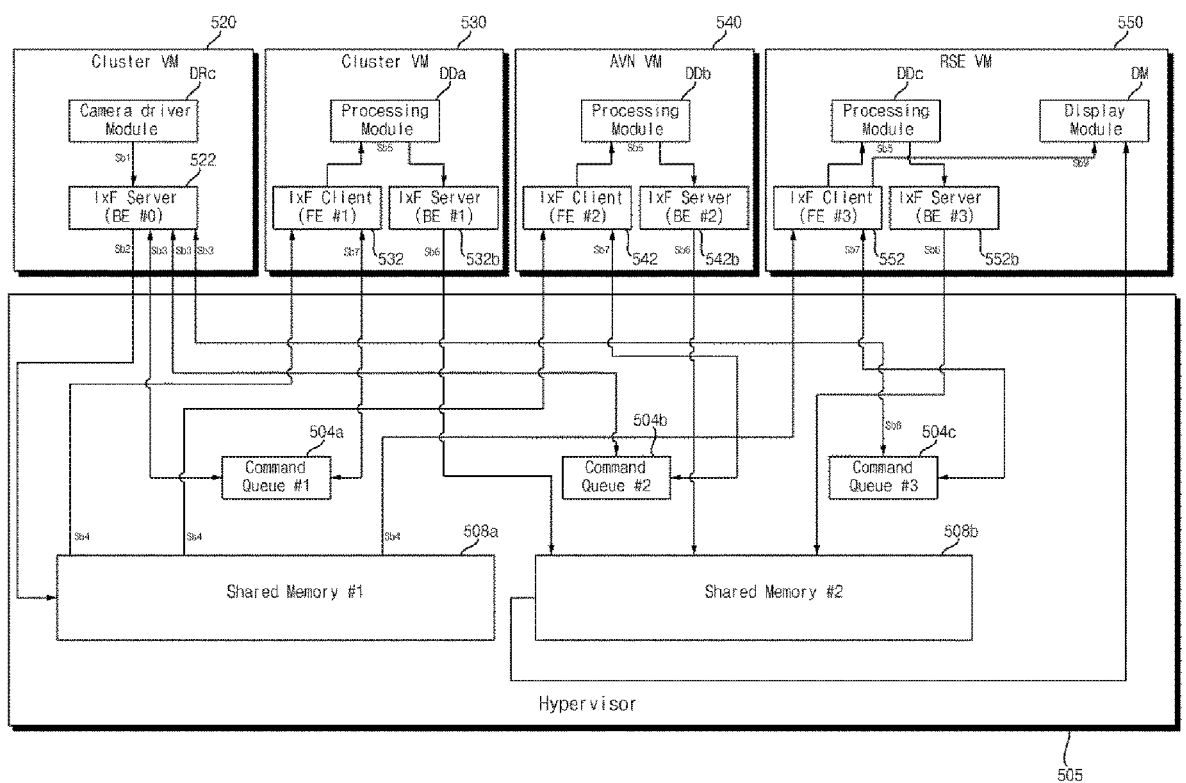
Figure 14A:
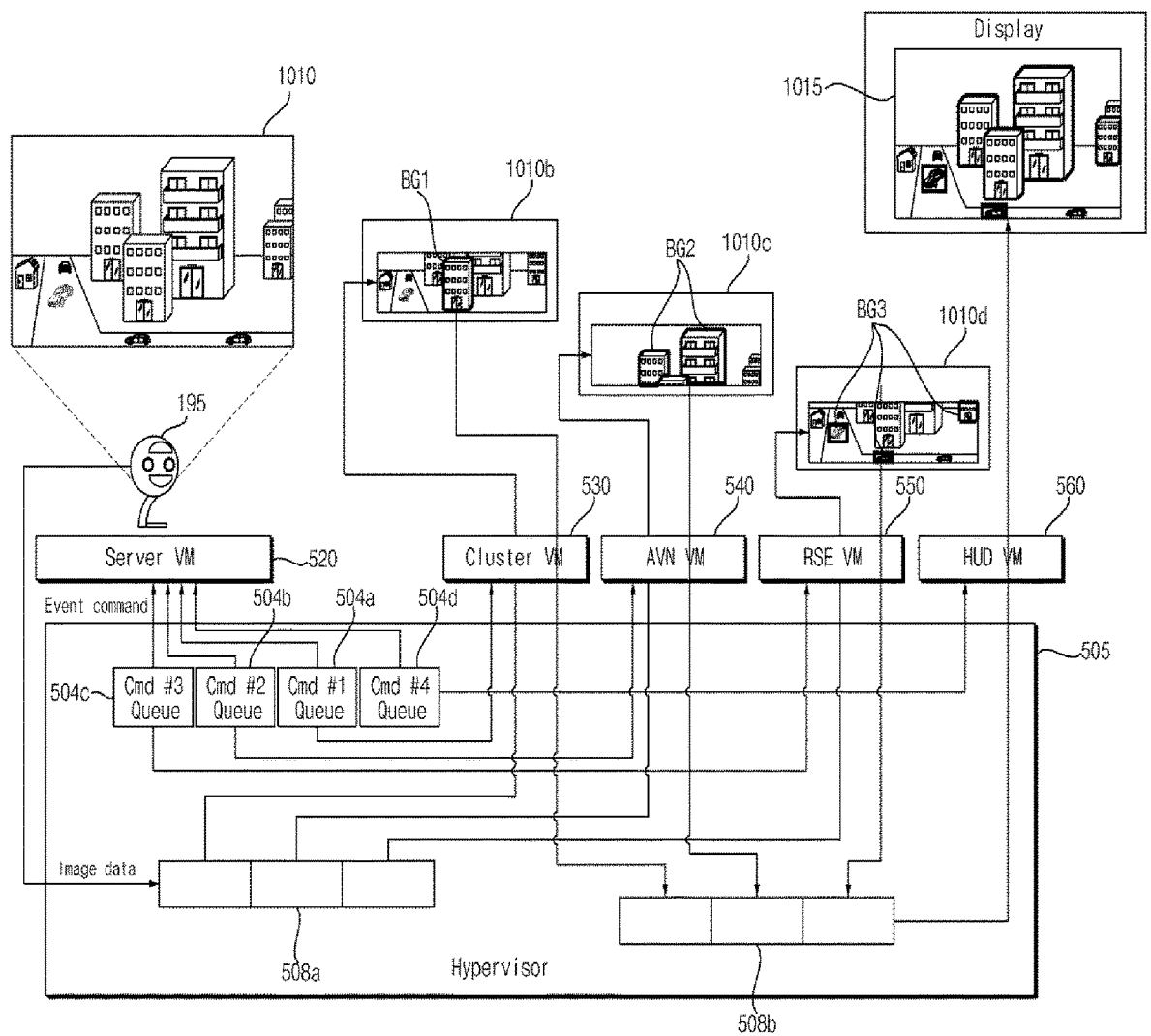
Figure 14B:
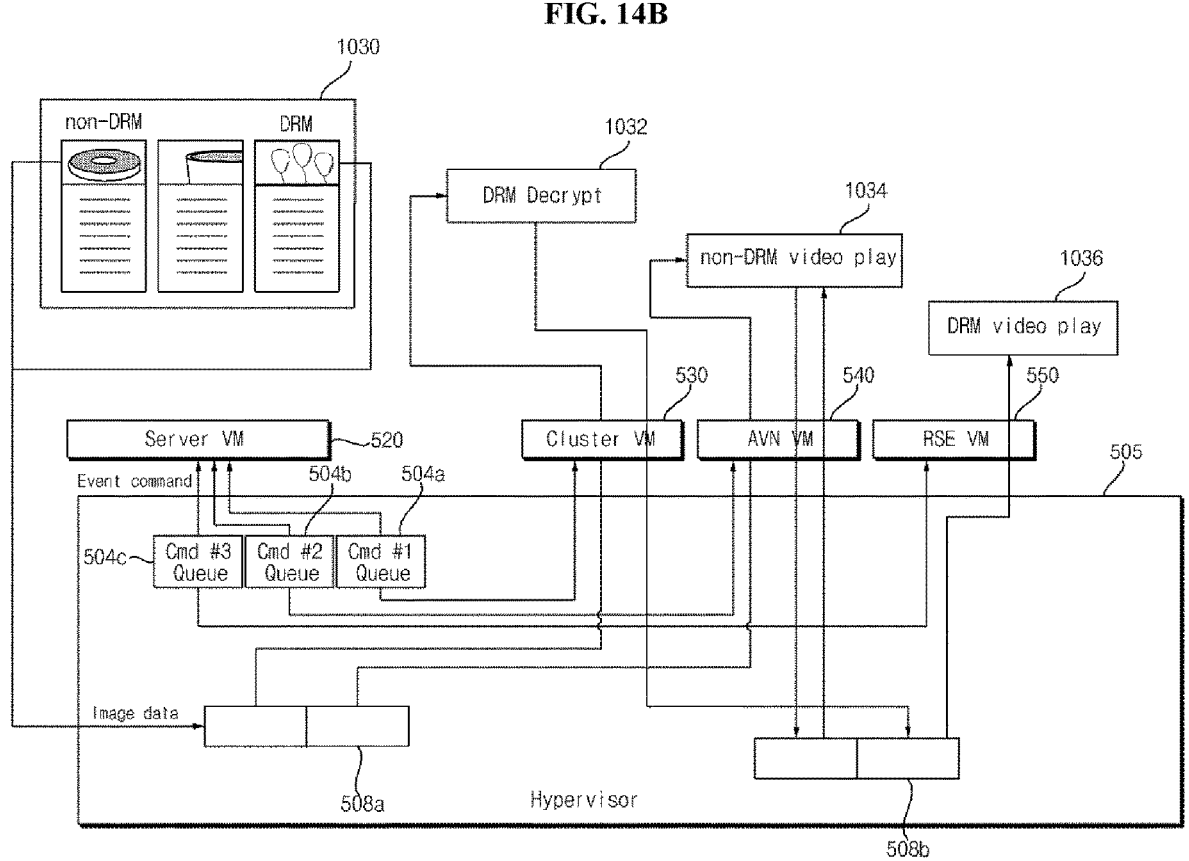

FIG. 12 is a view referred to in describing data division in the signal processing device according to the embodiment of the present disclosure, and FIGS. 13 to 14B are views referred to in describing the operation of FIG. 12.

First, FIG. 12 illustrates that, in order to signal-process image data 1010 acquired through a camera 915, the image data are divided and processed.

First, when data are image data 1010, the first virtual machine 520 in the processor 175 may write some 1010b of the image data 1010 in the first buffer in the first shared memory 508a and write some other 1010c of the image data 1010 in the second buffer in the first shared memory 508a.

The second virtual machine 530 and the third virtual machine 540 may detect objects from the received image data 1010b and 1010c, and may be configured to write the image data from which the objects have been detected in the second shared memory 508b.

Specifically, the second virtual machine 530 may write data from which an object BG1 has been detected in the first buffer in the second shared memory 508b, and the third virtual machine 540 may write data from which an object BG2 has been detected in the second buffer in the second shared memory 508b.

Meanwhile, when the fourth virtual machine 550 for the RSE display 180c is executed in addition to the second virtual machine 530 and the third virtual machine 540, as shown in the figure, the first virtual machine 520 in the processor 175 may write some 1010b of the image data 1010 in the first buffer in the first shared memory 508a, may write some other 1010c of the image data 1010 in the second buffer in the first shared memory 508a, and write some other 1010d of the image data 1010 in the third buffer in the first shared memory 508a.

The second virtual machine 530 may write data from which the object BG1 has been detected in the first buffer in the second shared memory 508b, the third virtual machine 540 may write data from which the object BG2 has been detected in the second buffer in the second shared memory 508b, and the fourth virtual machine 550 may write data from which an object BG3 has been detected in the third buffer in the second shared memory 508b.

As a result, the plurality of virtual machines for the plurality of displays in the vehicle may divide and process data at the time of object detection. Consequently, rapid data processing is possible.

Meanwhile, the image data divided and processed in the signal processing device 170 may be combined, and a composite image 1015 may be displayed on the display. Consequently, the rapidly signal-processed image data may be displayed through the display in the vehicle.

The figure illustrates that the composite image 1015 is displayed on the RSE display 180c. However, the present disclosure is not limited thereto, and the image may be displayed on any one of the cluster display 180a and the audio video navigation (AVN) display 180b.

Referring to FIG. 13, for divided processing of the image data of FIG. 12, the first virtual machine 520 transmits image data from the camera driver DRc to the input and output server interface 522 (Sb1).

Subsequently, the input and output server interface 522 writes the image data in the first shared memory 508a (Sb2).

Meanwhile, the input and output server interface 522 may create a command or a command queue for event processing in addition to allocation of the shared memory for data transmission (Sb3).

For example, the first virtual machine 520 in the processor 175 may create command queues 504a and 504b for distributed processing of data in the second virtual machine 530 and the third virtual machine 540.

As another example, as shown in FIG. 13, the first virtual machine 520 in the processor 175 may create command queues 504a, 504b, and 504c for distributed processing of data in the second virtual machine 530, the third virtual machine 540, and the fourth virtual machine 550.

Meanwhile, the first virtual machine 520 in the processor 175 may create command queues corresponding to the number of virtual machines for distributed processing of data.

That is, when the number of virtual machines for distributed processing of data is three, i.e. the second virtual machine 530, the third virtual machine 540, and the fourth virtual machine 550, as shown in FIG. 13, three command queues 504a, 504b, and 504c may be created.

Meanwhile, when the second virtual machine 530 and the third virtual machine 540 share the same data, as shown in FIG. 9A, the first virtual machine 520 in the processor 175 may create one command queue.

Meanwhile, the command queue may include at least one of virtual machine index information, task information, or shared memory information.

The virtual machine index information may indicate information regarding virtual machines that will divide and process data, the task information may indicate details of a command to be executed at the time of divided processing of data, and the shared memory information may indicate position information of a memory for shared data or buffer information.

Meanwhile, the task information may be classified as object detection, image display, DRM decryption, and user-specific sound detection.

Meanwhile, after allocation of the first shared memory 508a, the input and output server interface 522 may transmit information regarding the first shared memory 508a including key data to input and output client interfaces 532, 542, and 552.

Meanwhile, the input and output client interfaces 532, 542, and 552 in the second to fourth virtual machines 530, 540, and 550 may copy data in the first shared memory 508a based on the command queues 504a, 504b, and 504c, respectively (Sb4).

That is, the input and output client interfaces 532, 542, and 552 in the second to fourth virtual machines may copy some data 1010b, 1010c, and 1010d in FIG. 12, respectively.

Subsequently, signal processing modules DDa, DDb, and DDc in the second to fourth virtual machines 530, 540, and 550 perform signal processing (Sb5).

For example, the signal processing modules DDa, DDb, and DDc in the second to fourth virtual machines 530, 540, and 550 may detect different objects.

Subsequently, the input and output client interfaces 532b, 542b, and 552b in the second to fourth virtual machines 530, 540, and 550 perform writing in the second shared memory 508b (Sb6).

Subsequently, when writing of data processed by the second to fourth virtual machines 530, 540, and 550 in the second shared memory 508b is completed, a completion message may be transmitted to the input and output server interface 522 (Sb7).

The input and output server interface 522 may transmit a third command queue 504c including a command for image display to the fourth virtual machine 550 (Sb8).

Subsequently, the fourth virtual machine 550 may receive the third command queue 504c, and may be configured to display write the image data written in the second shared memory 508b through the RSE display 180c (Sb9).

FIG. 14A is similar to FIG. 12 except that a fifth virtual machine 560 for HUD display is further executed.

Referring to the figure, in order to signal-process the image data acquired through the camera 915, the image data are divided and processed.

When data are image data 1010, the first virtual machine 520 in the processor 175 may write some 1010b of the image data 1010 in the first buffer in the first shared memory 508a, may write some other 1010c of the image data 1010 in the second buffer in the first shared memory 508a, and write some other 1010d of the image data 1010 in the third buffer in the first shared memory 508a.

The input and output client interfaces 532, 542, and 552 in the second to fourth virtual machines 530, 540, and 550 may receive some image data, may perform signal processing, and write the signal-processed image data in the second shared memory 508b.

In particular, the image data from which an object has been detected may be written in the second shared memory 508b.

Subsequently, the first virtual machine 520 may transmit a command queue 504d for image display to the fifth virtual machine 560, and the fifth virtual machine 560 may copy the image date written in the second shared memory 508b and may be configured to display a composite image 1015 on a HUD display 180f. Consequently, image display based on division of signal processing may be performed.

FIG. 14B is a view showing that data division is performed for decryption, not object detection, unlike FIG. 14A.

Referring to the figure, when a partial encrypted area is included in image data 1030, the first virtual machine 520 in the processor 175 may write encrypted image data 1032 in the first buffer in the first shared memory 508a, and write unencrypted image data 1034 in the second buffer in the first shared memory 508a.

The first command queue 504a and the second command queue 504b are used for data transmission to the second virtual machine 530 and the third virtual machine 540.

Based on the first command queue 504a, the second virtual machine 530 decrypts the partial encrypted area and write the decrypted data in the second buffer in the second shared memory 508b.

Meanwhile, based on the second command queue 504b, the third virtual machine 540 signal-processes the unencrypted image data 1034 and write the signal-processed data in the first buffer in the second shared memory 508b.

Meanwhile, when the first virtual machine 520 outputs the third command queue 504c for image display, the fourth virtual machine 550 may be configured to copy the image data written in the second shared memory 508b and display decrypted image 1036 on the HUD display 180f based on the third command queue 504c. Consequently, image display based on division of signal processing may be performed.

Figure 15A:
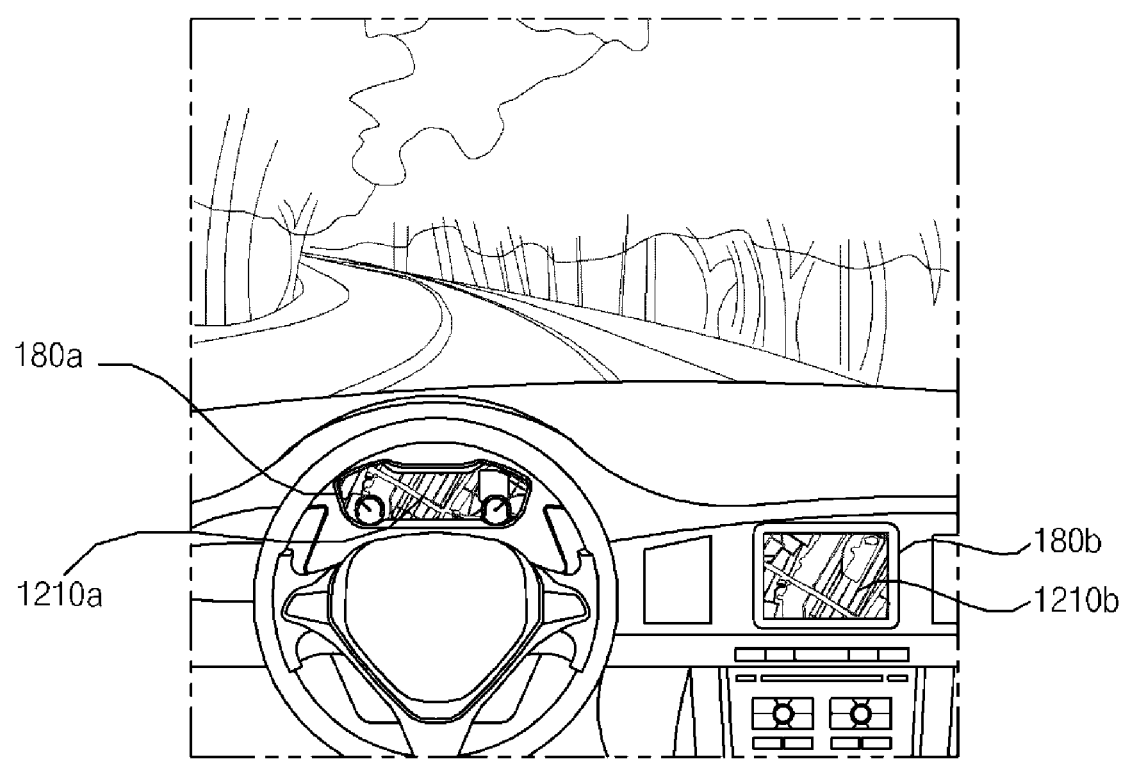

FIG. 15A illustrates that the same images 1210a and 1210b are displayed respectively on the first display 180a and the second display 180b in the vehicle.

For example, in the case in which the second virtual machine 530 is operated for rendering of the first display 180a and the third virtual machine 540 is operated for rendering of the second display 180b, 1:N data communication by the first virtual machine 520 is performed, whereby synchronized images are displayed, as shown in the figure.

Figure 15B:
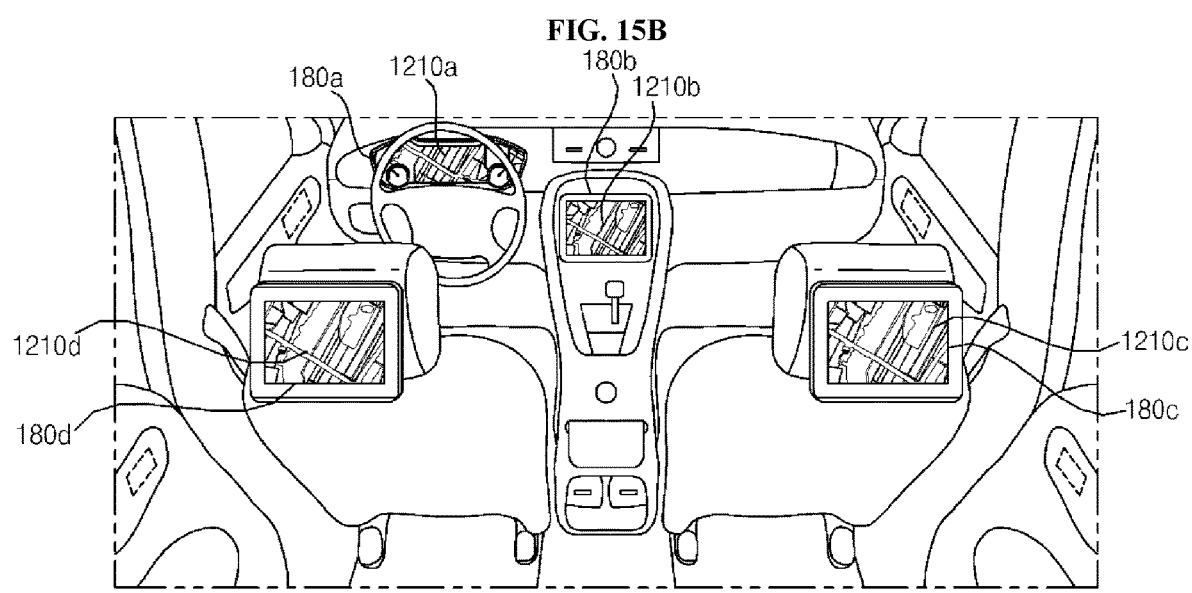

FIG. 15B illustrates that the same images 1210a, 1210b, 1210c, and 1210d are displayed respectively on the first display 180a, the second display 180b, the third display 180c, and the fourth display 180d in the vehicle.

For example, in the case in which the second virtual machine 530 is operated for rendering of the first display 180a, the third virtual machine 540 is operated for rendering of the second display 180b, the fourth virtual machine (not shown) is operated for rendering of the third display 180c, and a fifth virtual machine (not shown) is operated for rendering of the fourth display 180d, 1:N data communication by the first virtual machine 520 is performed, whereby synchronized images are displayed, as shown in the figure.

Figure 15C:
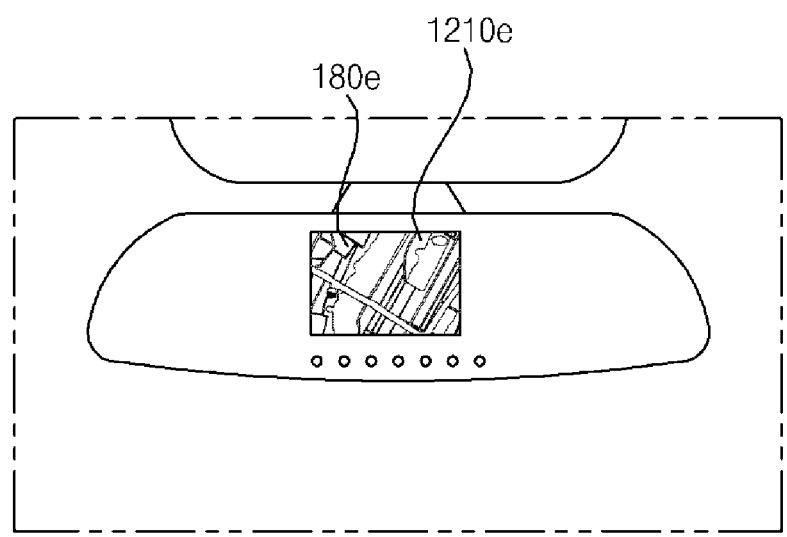

FIG. 15C illustrates that a display 180e is formed on a rear-view mirror in the vehicle in order to display an image 1210e.

For example, in the case in which FIGS. 15A and 15C are linked to each other, the same images 1210a, 1210b, and 1210e may be displayed respectively on the first display 180a, the second display 180b, and the rear-view mirror display 180e in the vehicle.

Meanwhile, in the case in which the second virtual machine 530 is operated for rendering of the first display 180a, the third virtual machine 540 is operated for rendering of the second display 180b, and the fourth virtual machine (not shown) is operated for rendering of the rear-view mirror display 180e, 1:N data communication by the first virtual machine 520 is performed, whereby synchronized images are displayed, as shown in the figure.

As another example, in the case in which FIGS. 15B and 15C are linked to each other, the same images 1210a, 1210b, 1210c, 1210d, and 1210e may be displayed respectively on the first display 180a, the second display 180b, the third display 180c, the fourth display 180d, and the rear-view mirror display 180e in the vehicle.

Figure 16:
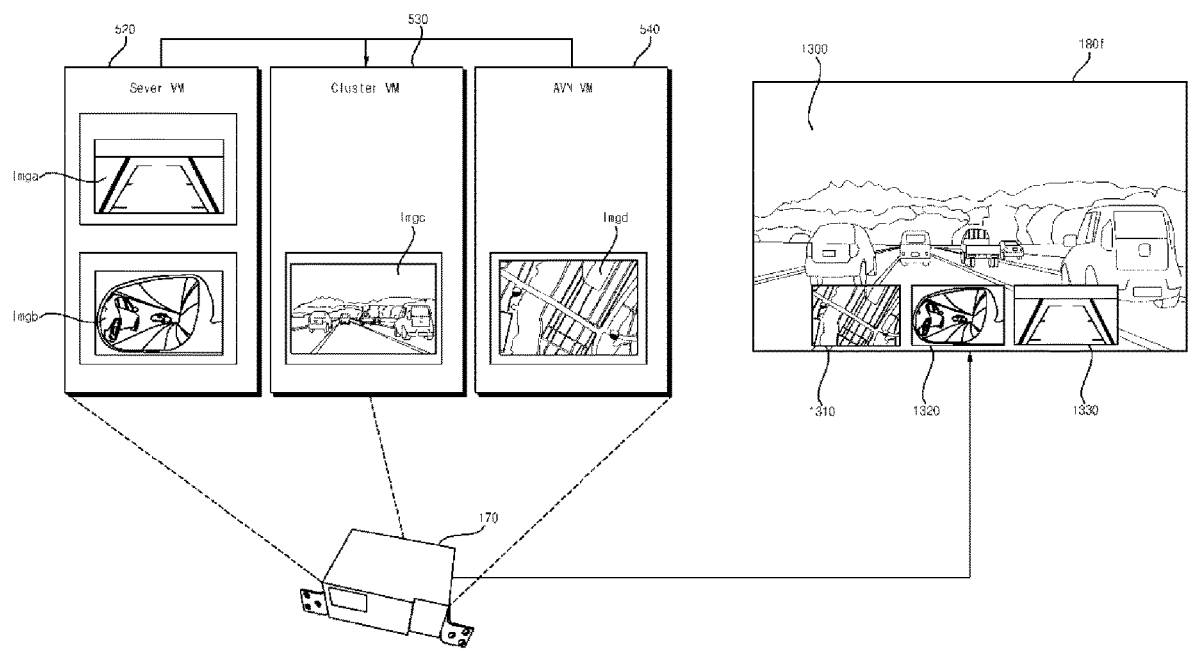

FIG. 16 illustrates that a HUD display 180f is disposed in the vehicle.

Referring to the figure, the display apparatus 100 for vehicle may include a first display 180a corresponding to an instrument cluster, a second display 180b corresponding to an AVN, and a HUD display 180f.

The signal processing device 170 may be configured to display an image created by combining first image data processed by the first virtual machine 520, second image data processed by the second virtual machine 530, and third image data processed by the third virtual machine 540 on the third display 180c.

The figure illustrates that the first virtual machine 520 processes rear-view mirror image data Imga and side mirror image data Imgb, the second virtual machine 530 processes front camera image data Imgc, the third virtual machine 540 processes navigation image data Imgd, and an image created by combining the four kinds of image data is displayed on the HUD display 180f, which is a third display.

The figure illustrates that an image 1300 corresponding to the front camera image data Imgc is a background, and images 1310, 1320, and 1330 corresponding respectively to the navigation image data Imgd, the side mirror image data Imgb, and the rear-view mirror image data Imga are displayed together. As a result, synchronized images may be displayed together. Consequently, it is possible for a user to check all images around the vehicle through the HUD display 180f.

Figure 17:
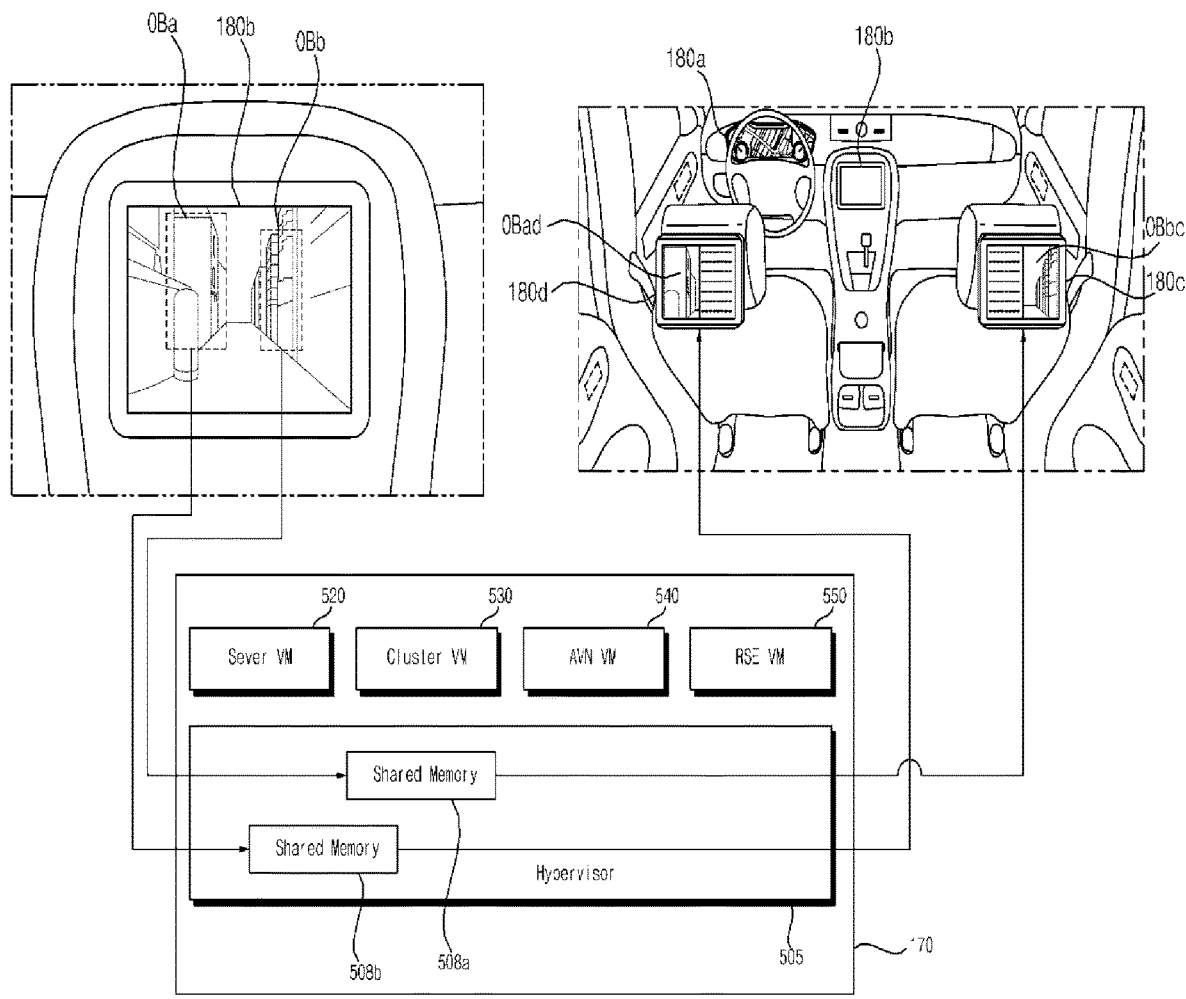

FIG. 17 illustrates that portions Oba and OBb of an image displayed on the second display 180b are processed and displayed on the third display 180c and the fourth display 180d, which are RSE displays, in a synchronized state.

The figure illustrates that a partial image OBad is displayed on the third display 180c and another partial image OBbd is displayed on the fourth display 180d in a synchronized state.

Figure 18:
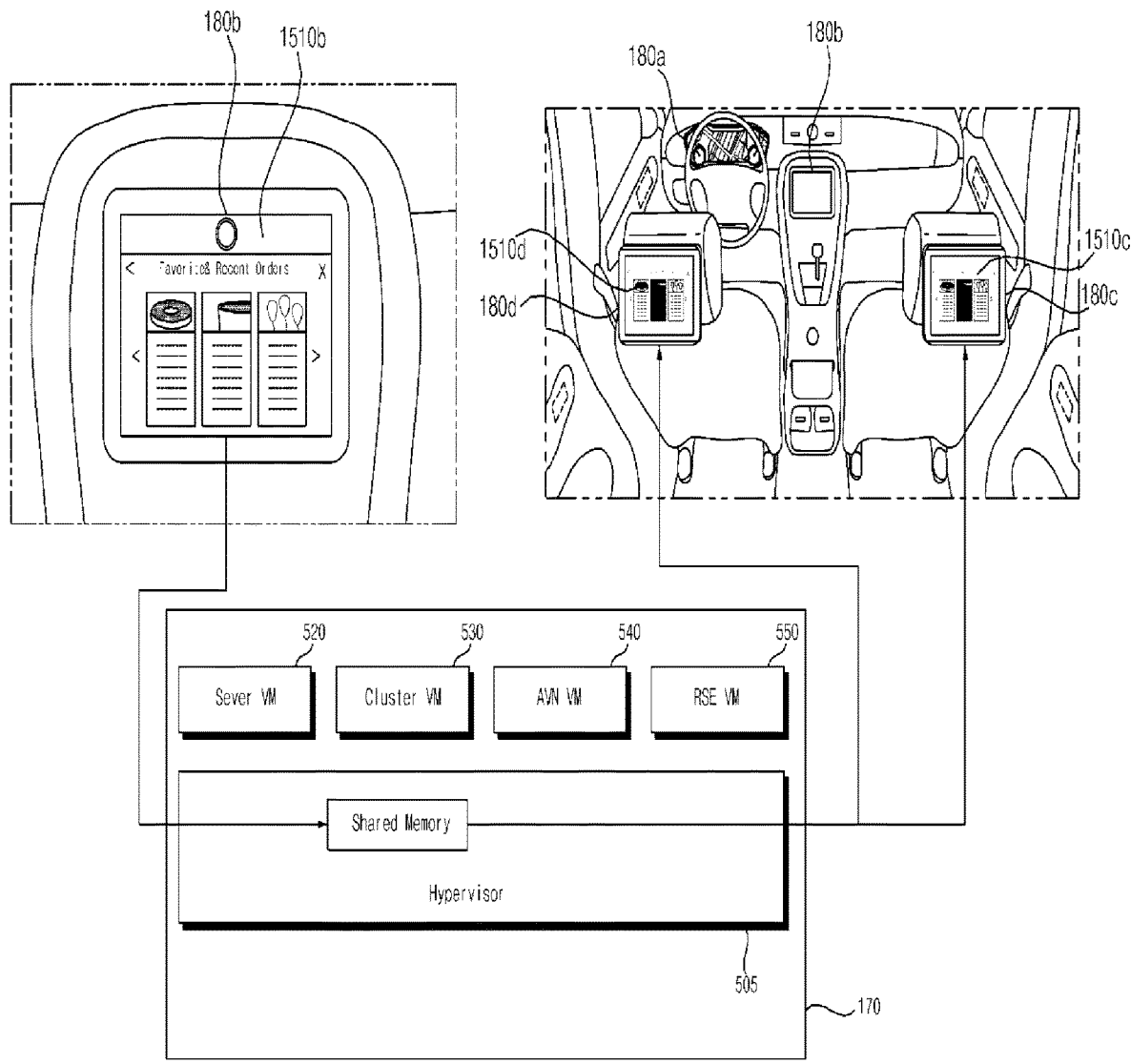

FIG. 18 illustrates that an image 1510b displayed on the second display 180b is processed and displayed on the third display 180c and the fourth display 180d, which are RSE displays, in a synchronized state.

The figure illustrates that the same image 1510c is displayed on the third display 180c and the same image 1510d is displayed on the fourth display 180d in a synchronized state.

Meanwhile, in the display apparatus 100 for vehicle according to the embodiment of the present disclosure, the first virtual machine 520 in the signal processing device 170 may receive first touch input on the first display 180a through the second virtual machine 530 and may transmit image data processed based on the first touch input to the second virtual machine 530 and the third virtual machine 540 through the shared memory 508, and the first display 180a and the second display 180b may display the same images corresponding to the first touch input. Consequently, the plurality of displays 180a and 180b in the vehicle may display the same images in a synchronized state.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising a processor configured to perform signal processing for a plurality of displays located in a vehicle, wherein
the processor is configured to execute first to third virtual machines for processing data on a hypervisor in the processor,
wherein the processor is further configured to:
through the first virtual machine, share a first portion of the data with the second virtual machine and a second portion of the data with the third virtual machine for processing of divided data,
in response to receiving Ethernet data through Ethernet communication, transmit, through the first virtual machine, the Ethernet data to the second virtual machine or the third virtual machine using one or more shared memories based on the hypervisor, and
in response to receiving controller area network (CAN) communication data, transmit, through the first virtual machine, the CAN communication data to the second virtual machine or the third virtual machine using the one or more shared memories based on the hypervisor.

2. The signal processing device of claim 1, wherein the processor is further configured to:
through the first virtual machine, write the first portion of the data into a first shared memory of the one or more shared memories for transmission to the second virtual machine and write the second portion of the data into the first shared memory for transmission to the third virtual machine, and
through the second virtual machine and the third virtual machine, process the data in written the first shared memory and write the processed data into a second shared memory of the one or more shared memories.

3. The signal processing device of claim 2, wherein the processor is further configured to, through the first virtual machine, process a third portion of the data and write the processed data into the second shared memory.

4. The signal processing device of claim 2, wherein
the processor further configured to:
execute a fourth virtual machine,
through the first virtual machine, write a third portion of the data into the first shared memory, and through the fourth virtual machine, process the third portion of the data and write the processed third portion of the data into the second shared memory.

5. The signal processing device of claim 1, wherein in the processor is further configured to, through the first virtual machine, create command queues for distributed processing of the data in the second virtual machine and the third virtual machine.

6. The signal processing device of claim 5, wherein, when the second virtual machine and the third virtual machine share the same data, and the processor is further configured to, through the first virtual machine, create one command queue.

7. The signal processing device of claim 6, wherein the command queue comprises at least one of virtual machine index information, task information, or shared memory information.

8. The signal processing device of claim 1, wherein the processor is further configured to, through the first virtual machine, create command queues corresponding to a number of virtual machines for distributed processing of the data.

9. The signal processing device of claim 2, wherein
in response to the data being image data, the processor is further configured to:
through the first virtual machine, write a first portion of the image data into the first shared memory for transmission to the second virtual machine and write a second portion of the image data into the first shared memory for transmission to the third virtual machine, and
through the second virtual machine and the third virtual machine, detect objects from the first and second portions of the image data written in the first shared memory and write image data corresponding to the objects which have been detected into the second shared memory.

10. The signal processing device of claim 9, wherein the processor is further configured to:
execute a fourth virtual machine,
through the first virtual machine, write a third portion of the image data into the first shared memory, and
through the third virtual machine, detect an object from the third portion of the image data written in the first shared memory and write image data corresponding to the object which has been detected into the second shared memory.

11. The signal processing device of claim 2, wherein
in response to the data being image data, the first virtual machine in the processor is configured to write a first portion of the image data into the first shared memory for transmission to the second virtual machine and write a second portion of the image data into the first shared memory for transmission to the third virtual machine,
the second virtual machine is configured to decrypt the first portion of the image data and write the decrypted first portion of the image data into the second shared memory, and
the third virtual machine is configured to process the second portion of the image data written in the first shared memory and write the processed second portion of the image data into the second shared memory.

12. The signal processing device of claim 2, wherein the processor is further configured to:
through the first virtual machine, execute an input and output server interface and a security manager, and
through each of the second virtual machine and the third virtual machine, execute an input and output client interface.

13. The signal processing device of claim 12, wherein the processor is further configured to:
through the input and output server interface, transmit information regarding the first shared memory comprising key data to the input and output client interface after allocation of the first shared memory, and
through the input and output client interface, access the first shared memory based on the key data.

14. The signal processing device of claim 12, wherein the processor is further configured to, through the input and output server interface:
receive information regarding a first buffer in the first shared memory, the first buffer being empty,
write first data in the first buffer into the first shared memory, and
transmit buffer information of the first buffer to the input and output client interfaces in the second virtual machine and the third virtual machine.

15. The signal processing device of claim 14, wherein the processor is further configured to:
change a reference count of the first buffer in a first direction based on writing of the first data in the first buffer, and
in response to copying of the first data from the first buffer being completed, change the reference count of the first buffer in a second direction, the second direction being opposite the first direction.

16. The signal processing device of claim 1, wherein the processor is further configured to:
execute a legacy virtual machine configured to receive and process Ethernet data, and
through the first virtual machine receive, process, and output at least one of vehicle sensor data, position information data, camera image data, audio data, or touch input data.

17. The signal processing device of claim 1, wherein the processor is further configured to, through the first virtual machine receive and process wheel speed sensor data of the vehicle, and transmits the processed wheel speed sensor data to at least one of the second virtual machine or the third virtual machine.

18. A display apparatus for vehicle, the display apparatus comprising:
a plurality of displays including:
a first display; and
a second display; and
a signal processing device comprising a processor configured to perform signal processing for the first display and the second display, wherein
the processor is configured to execute first to third virtual machines for processing data on a hypervisor in the processor,
wherein the processor is further configured to:
through the first virtual machine, share a first portion of the data with the second virtual machine and a second portion of the data with the third virtual machine for processing of divided data,
in response to receiving Ethernet data through Ethernet communication, to transmit, through the first virtual machine, the Ethernet data to the second virtual machine or the third virtual machine using a shared memory based on the hypervisor, and
in response to receiving controller area network (CAN) communication data, to transmit, through the first virtual machine, the CAN communication data to the second virtual machine or the third virtual machine using the shared memory based on the hypervisor.

19. The display apparatus of claim 18, wherein the signal processing device is configured to divide and process image data using the second and third virtual machines, combine the divided and processed image data, and display the combined image data through the plurality of displays.

\* \* \* \* \*